United States Patent [19]
Rao et al.

[11] Patent Number: 5,513,271
[45] Date of Patent: Apr. 30, 1996

[54] ANALYZING AN IMAGE SHOWING A PROPORTIONED PARTS GRAPH

[75] Inventors: Satyajit Rao, Bangalore, Ind.; James V. Mahoney, San Francisco, Calif.

[73] Assignee: Xerox Corporation, Stamford, Conn.

[21] Appl. No.: 157,856

[22] Filed: Nov. 24, 1993

[51] Int. Cl.⁶ .................................................. G06K 9/00
[52] U.S. Cl. .................. 382/113; 382/203; 382/168; 382/100
[58] Field of Search ................................ 382/1, 18, 21, 382/22, 25, 28, 69, 203, 100, 113, 168; 395/102, 140, 142, 146; 358/448, 462, 467, 530, 537, 538, 539; 250/556

[56] References Cited

U.S. PATENT DOCUMENTS

| | | | |
|---|---|---|---|
| 3,335,408 | 8/1967 | Oliver | 250/556 |
| 3,536,895 | 10/1970 | Dedden et al. | 250/556 |
| 3,555,244 | 1/1971 | Spauszms et al. | 250/555 |
| 3,936,607 | 2/1976 | Loubal | 364/551.01 |
| 4,644,367 | 2/1987 | Onoda et al. | 395/102 |
| 4,674,042 | 6/1987 | Hernandez et al. | 395/140 |
| 4,682,902 | 7/1987 | Onoda et al. | 345/168 |
| 4,730,930 | 3/1988 | Thoreson et al. | 382/17 |
| 4,815,029 | 3/1989 | Barker et al. | 395/146 |
| 5,291,561 | 3/1994 | Tanaka et al. | 382/22 |
| 5,317,650 | 5/1994 | Harrington | 382/22 |
| 5,392,130 | 2/1995 | Mahoney | 358/400 |
| 5,404,439 | 4/1995 | Moran et al. | 395/155 |
| 5,455,898 | 10/1995 | Mahoney et al. | 395/133 |

OTHER PUBLICATIONS

European Search Report, Application No. EP 94 30 8651.
Jansen, H., and Krause, F.–L., "Interpretation of Freehand Drawings for Mechanical Design Processes", *Computer & Graphics*, vol. 8, No. 4, pp. 351–369, 1984.
Suenaga, Y., and Nagura, M., "A Facsimile Based Manuscript Layout and Editing System by Auxiliary Mark Recognition," 5th International Conference on Pattern Recognition, vol. 2, IEEE, 1980, pp. 856–858.
Ricoh Imagio MF530 Series General Catalog, Ricoh, K.K., 1992, with English translation of cover page and pp. 1–2 and 23–24.
Winston, P. H. and Horn, B. K. P., *Lisp*, Addison–Wesley, Reading, Mass., 1981, pp. 121–136 and 339–343.
The Apple Catalog, Fall 1993, pp. 1 and 4–5.

*Primary Examiner*—Leo Boudreau
*Assistant Examiner*—D. R. Anderson

[57] ABSTRACT

Input image data define an input image that shows a proportioned parts graph, such as a pie chart or a whole or segmented bar graph. The input image data are used to obtain segmented feature data indicating a feature in the input image that satisfies a constraint on segments. The segmented feature data are used to obtain proportion data indicating each segment's proportion. Various criteria could be applied to find parts of the input image that form the feature. For example, for some pie charts, the segments constraint could include a circularity criterion, a center criterion, and a direction criterion, and proportions could be obtained from directions. For other pie charts, the segments constraint could include a distinct regions criterion and a circularity criterion and proportions could be obtained from directions of region sides. The segments constraint could include a feature candidate criterion for a specific category of proportioned parts graphs, a center criterion applicable to all categories, and either a direction criterion or an angle criterion. The direction criterion could require a part that extends radially from a center, while the angle criterion permits parts that cover a range of angles. For either criterion, the segments constraint could also require nearness to a reference point such as the center. The input image can show a sketch and the proportion data can be used to obtain output image data defining an output image that includes a precisely formed proportioned parts graph or other graphical representation of the indicated proportions.

31 Claims, 13 Drawing Sheets

ANALYZING AN IMAGE SHOWING A PROPORTIONED PARTS GRAPH

BACKGROUND OF THE INVENTION

The present invention relates to techniques for analyzing an image showing a graphical representation.

The Ricoh Imagio MF530 Series General Catalog, Ricoh K.K., 1992, describes AI copying functions at pages 23 and 24. Page 23 mentions that hand-drawn numerals are converted "as is" into graphs and that hand-drawn lines are converted into straight lines. Page 23 shows how different types of graphs can be created by writing numerals by hand on a form. The types are designated as band graph, comparative bar graph, pie graph, stacked bar graph, stacked bar graph with shadows, bent line graph, heavy bent line graph, and three-dimensional pie graph. Page 24 shows how hand-drawn figures and tables can be cleanly redrawn; how hand-drawn charts can be cleanly traced and thus made easier to see; and how characters can be removed from tabular forms to produce blank forms for use.

SUMMARY OF THE INVENTION

The invention is based on the discovery of a technique for analyzing an image showing a proportioned parts graph such as a pie chart, a whole bar graph, or another graphical representation in which a feature defines a number of segments, with each segment representing a part of a whole, and with each segment having a size that bears approximately the same proportion to the feature as the part it represents bears to the whole. The technique analyzes the image to obtain information about the proportional size of each segment. The image can be a human:produced image showing a sketch of a proportioned parts graph.

The technique can, for example, receive image data defining an image showing a proportioned parts graph. The technique can use the image data to obtain segmented feature data indicating a feature that satisfies a constraint on segments. The technique can then use the segmented feature data to obtain proportion data indicating, for each segment in the feature, a proportion.

The constraint on segments can be structured in a way that depends on relationships among the specific categories of proportioned parts graphs being analyzed. The constraint on segments can include two alternative sets of critera for two specific categories of pie charts. Or the constraint on segments can include a feature candidate criterion for each of a number of specific categories of pie charts and a segment feature criterion that can be applied to feature candidates that meet the feature candidate criterion.

For one specific category, the constraint on segments can include a circularity criterion, a center criterion, and a direction criterion. These criteria are appropriate, for example, for a pie chart with an outer circle, an inner circle at the center, and radial lines extending from near the outer circle to near the inner circle. The circularity criterion can require a part that is approximately circular. The center criterion can require a part that is approximately at the center of the segmented feature. The direction criterion can require a part that indicates a direction with respect to a reference point, such as the center.

For another specific category, the constraint on segments can instead include a distinct regions criterion and a circularity criterion. These criteria are appropriate, for example, for a pie chart with an outer circle and radial lines connected to the outer circle and extending to a junction point near the center of the outer circle. The distinct regions criterion can require at least two distinct regions bounded by the feature.

If a feature candidate criterion is applied for each specific category, the resulting feature candidates can include a center candidate and either direction unit candidates, for a first set of specific categories, or angle unit candidates, for a second set of specific categories. The first set of specific categories can include, for example, pie charts with a circular connected component and radial lines or other features indicating directions from the center; the second set of specific categories can include, for example, pie charts with features that indicate angles. The constraint on segments can thus include a center criterion and either a direction criterion for the first set of specific categories or an angle criterion for the second set of specific categories. The direction criterion can require a part that is approximately radial with respect to a reference point such as the center. For both sets of specific categories, the constraint on segments can require that a part that meets the direction criterion or the angle criterion be nearer to a reference point, in its direction or within its angle, than any other part that meets the criterion.

The proportion data can include a list of directions or a list of angles, depending on the specific category of proportioned parts graph being analyzed.

The technique can store the proportion data or use it somehow. For example, the technique can use the proportion data to provide control signals to a system. Or the input image can show a sketch of a proportioned parts graph and the technique can use the proportion data to obtain data defining an image of a precisely formed proportioned parts graph similar to the sketch. Or the technique can use the proportion data to obtain data defining an image of another graphical representation of the proportions indicated by the proportion data.

The techniques can be implemented with a machine that includes image input circuitry and data indicating image processing instructions. The image input circuitry can receive data defining an image set that shows a proportioned parts graph. The machine's processor can execute the image processing instructions. In executing the image processing instructions, the processor can receive the input image data from the image input circuitry and use the input image data to obtain segmented feature data indicating a feature that satisfies a constraint on segments. The processor can then use the segmented feature data to obtain proportion data indicating, for each segment in the feature, a proportion. The machine can be a high-speed image processing server that responds to image processing requests from a network to which it is connected.

The machine can also include image output circuitry, and the processor can use the proportion data to obtain output image data defining an output image that includes a proportioned parts graph similar to the analyzed proportioned parts graph. The machine can be a fax server or a copier.

The technique can also be implemented in a software product that includes a storage medium and data stored by the storage medium. The software product can be used in a machine that includes image input circuitry. The data stored by the storage medium can include image processing instructions the machine's processor can execute. In executing the image processing instructions, the processor can receive input image data from the image input circuitry defining an input image that shows a proportioned parts graph and use the input image data to obtain segmented feature data indicating a feature that satisfies a constraint on segments. The processor can then use the segmented feature data to obtain proportion data indicating, for each segment in the feature, a proportion.

The technique described above is advantageous because it makes it possible to automatically analyze a wide variety of types of proportioned parts graphs. The proportion data obtained by the technique can be used to produce a precisely drawn image of a proportioned parts graph in response to a simple sketch by a user.

The following description, the drawings, and the claims further set forth these and other aspects, objects, features, and advantages of the invention.

Figure 6:
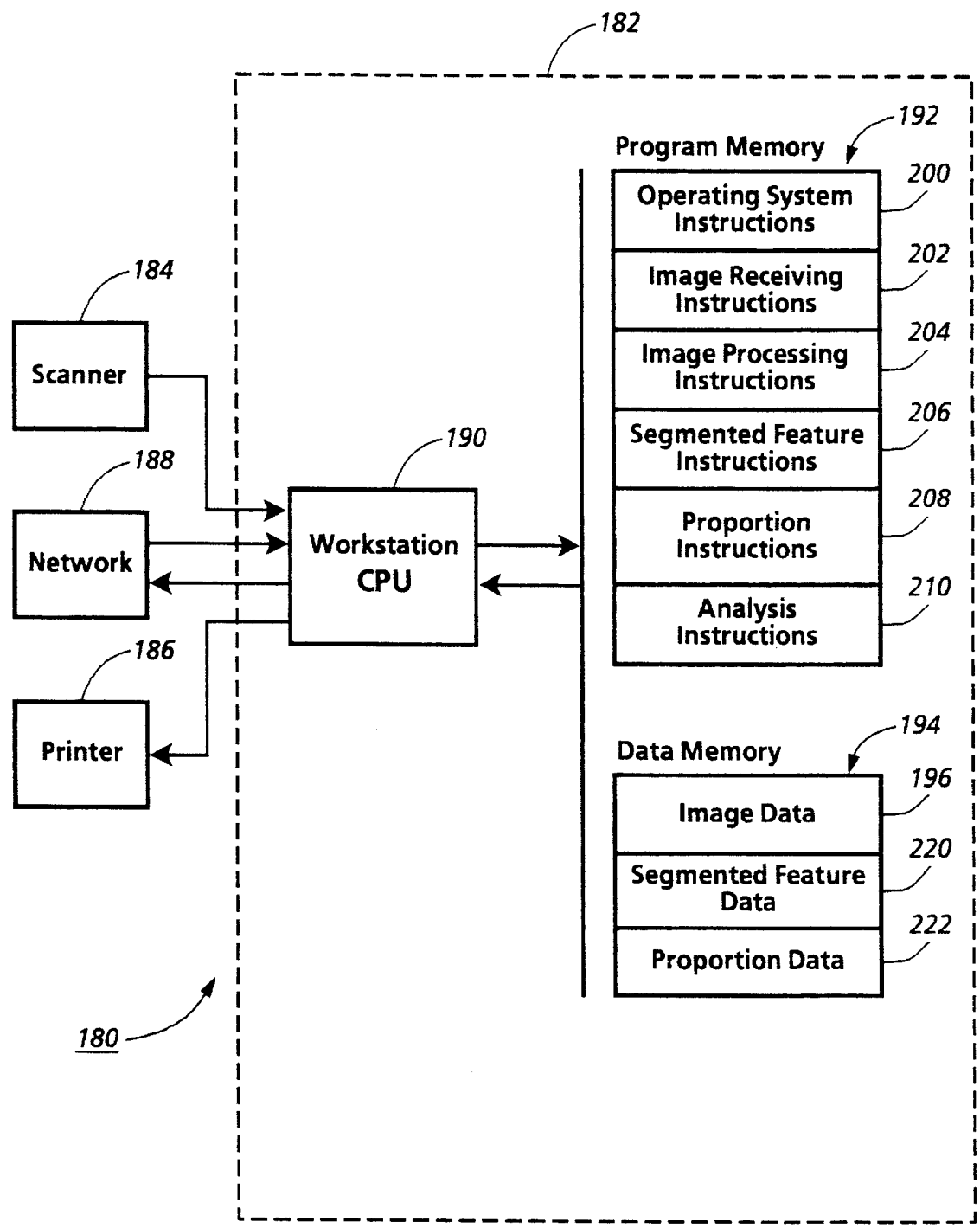
FIG. 6 is a schematic block diagram of a machine that can analyze an image showing a proportioned parts graph.
Figure 8:
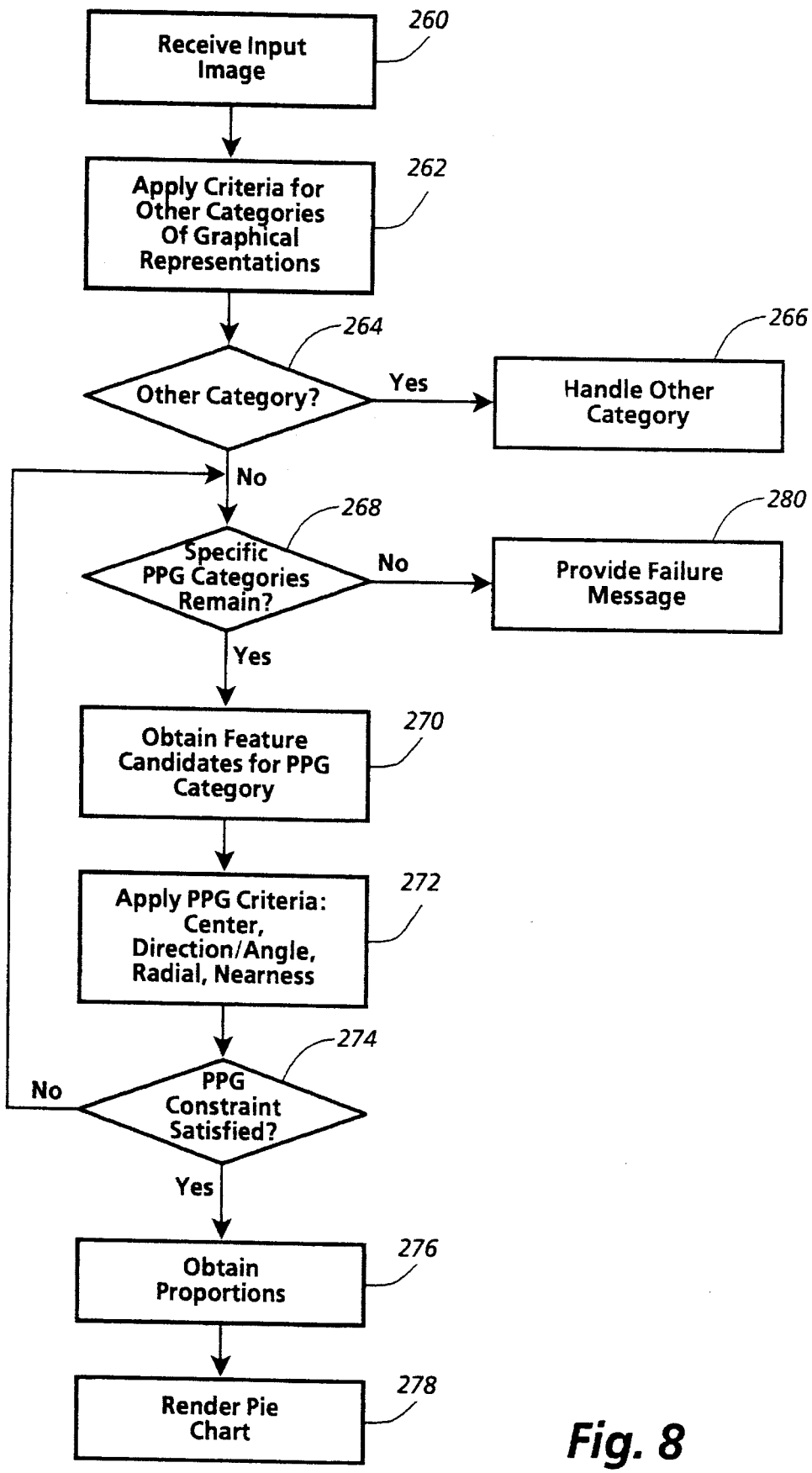
FIG. 8 is a flow chart of acts performed by the machine of FIG. 6 in a second implementation.
Figure 9:
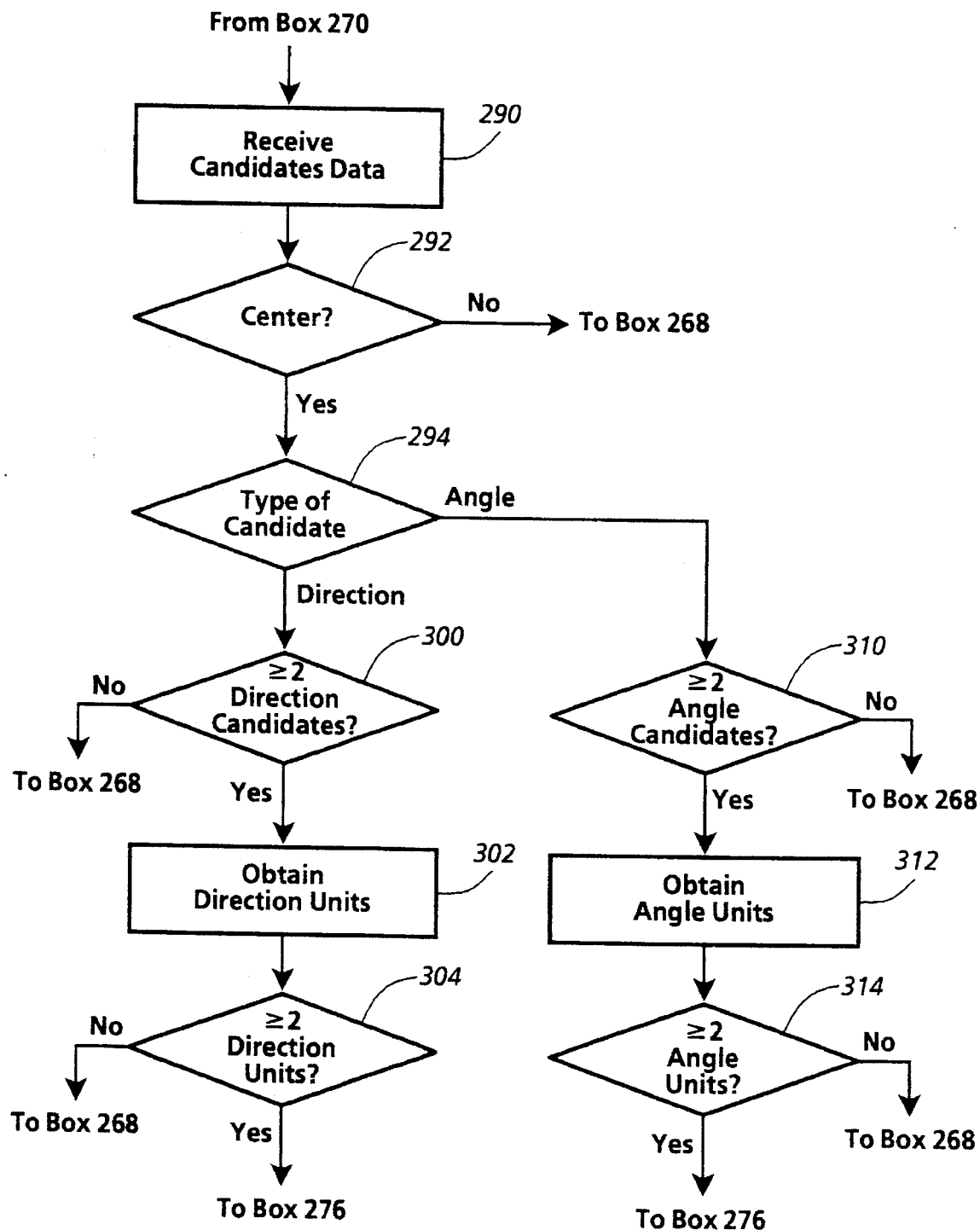
FIG. 9 is a flow chart showing how criteria can be applied in FIG. 8.

Each of FIGS. 10–15 shows an example of a sketch of a proportioned parts graph and a precisely formed proportioned parts graph obtained using techniques shown in FIGS. 6, 8, and 9.

Figure 16:
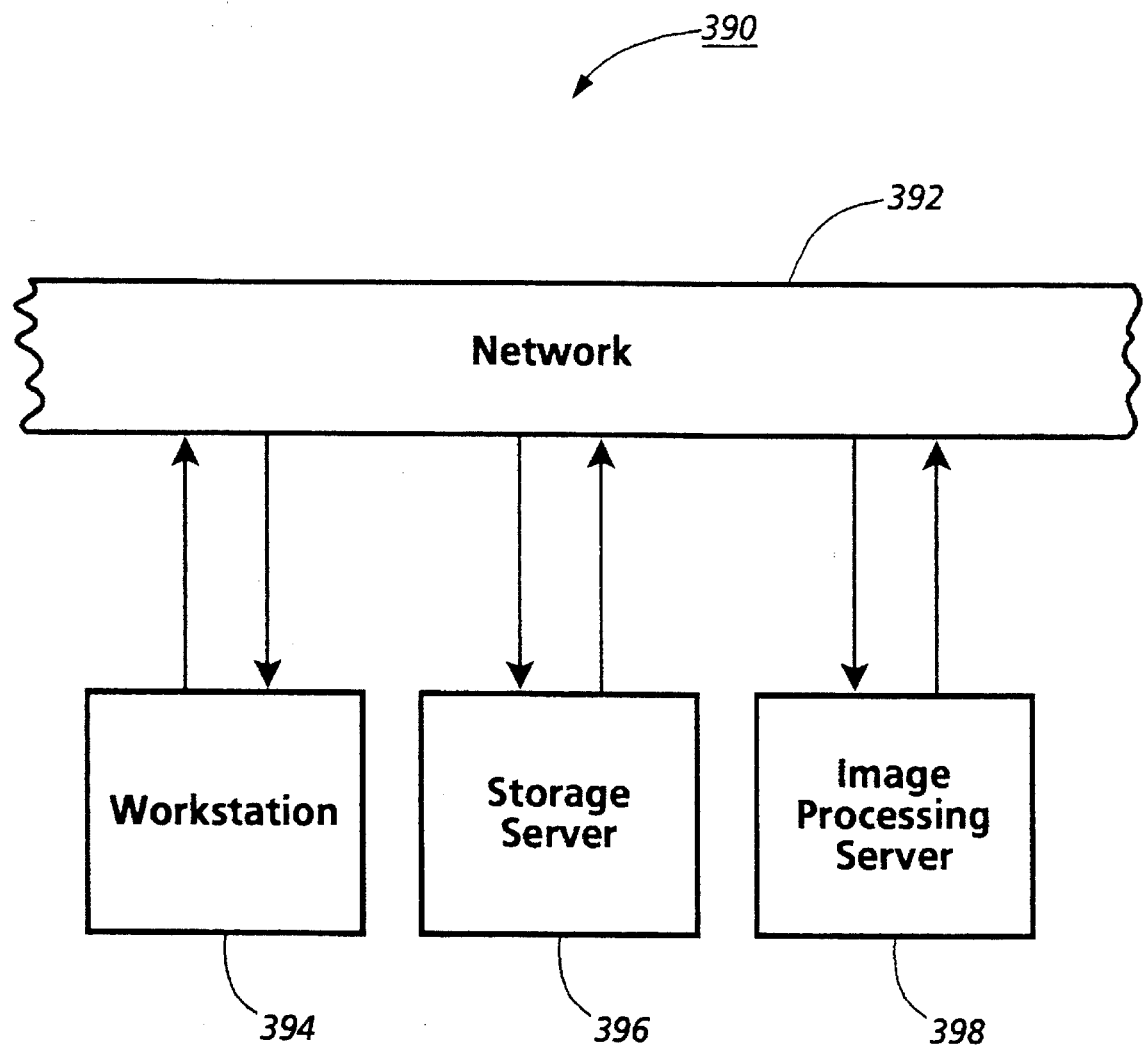

FIG. 16 is a schematic block diagram of an implementation with an image processing server.

Figure 17:
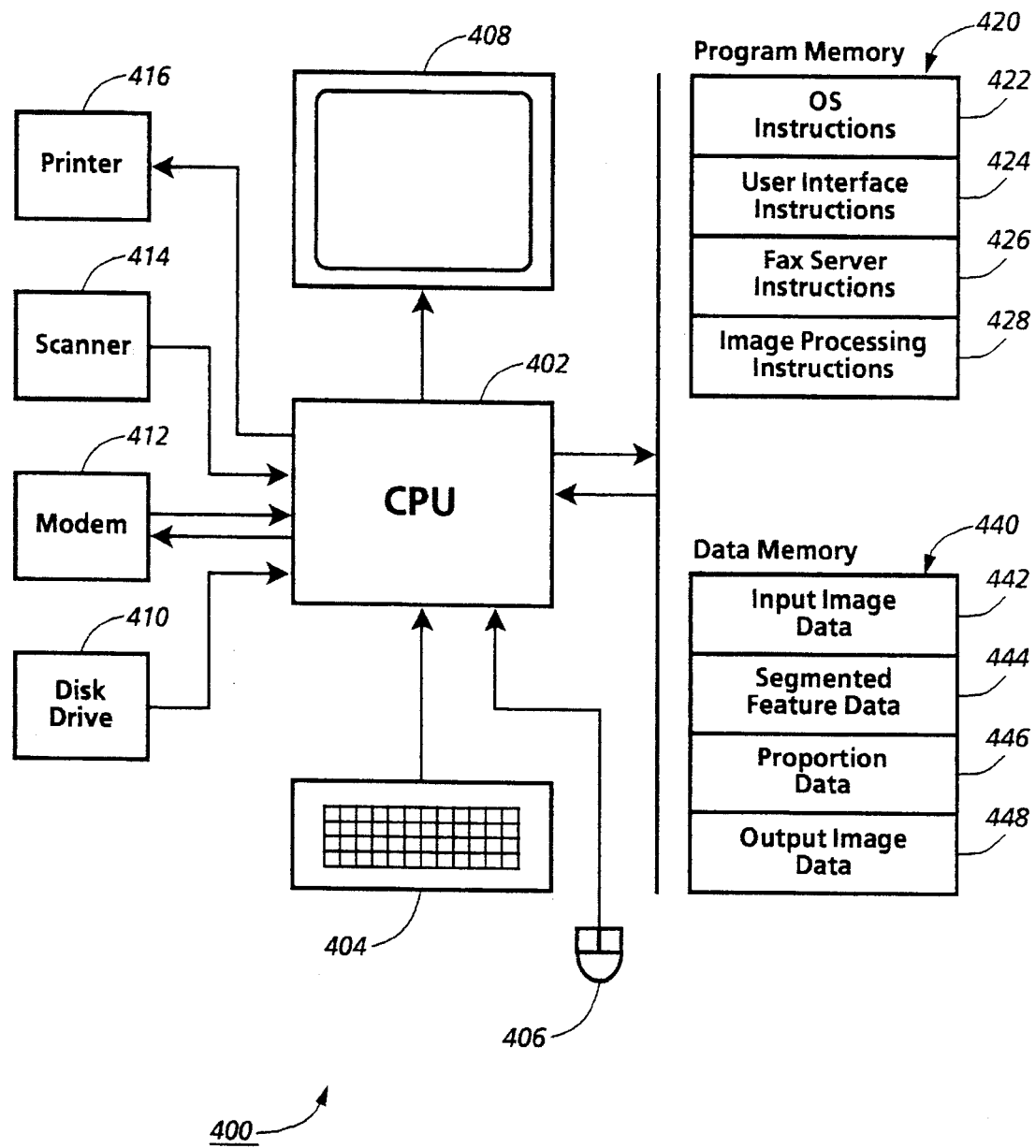

FIG. 17 is a schematic block diagram of a fax server application.

Figure 18:
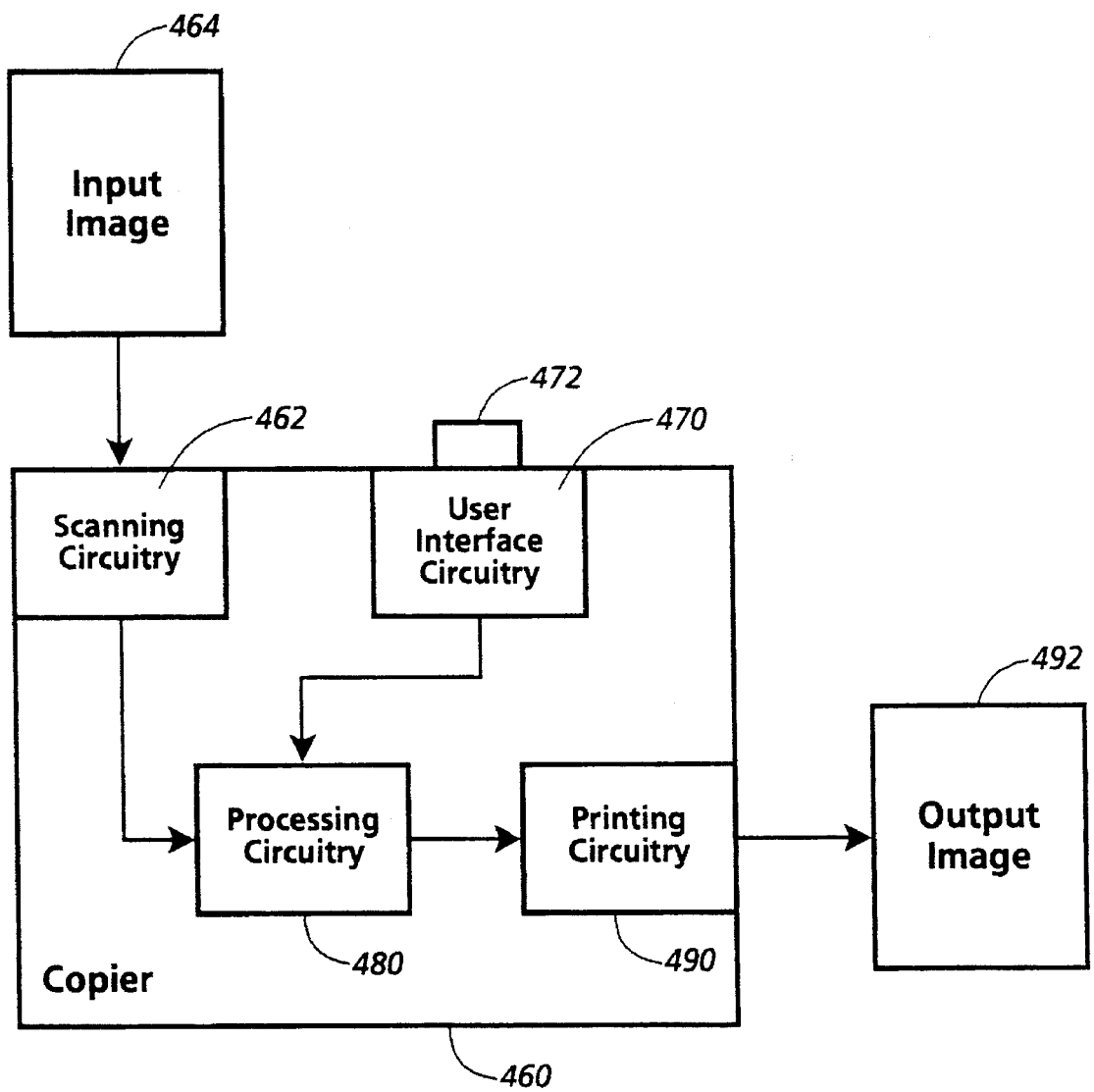

FIG. 18 is a schematic block diagram of a copier application.

DETAILED DESCRIPTION

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar sub-operations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

A "proportioned parts graph" is a graphical representation in which a feature defines a number of segments, with each segment representing a part of a whole, and with each segment having a size that bears approximately the same proportion to the feature as the part it represents bears to the whole. The most common category of graphical representation that is an example of proportioned parts graphs is the pie chart. In one type of bar graph, referred to herein as a "whole bar graph" or "segmented bar graph," each bar is a proportioned parts graph.

A "segmented feature" is a feature that includes information indicating parts of the feature that, together, define an entirety, such as the entire enclosed area of the feature, the entire angular extent about a point, the entire length of a feature, or the entire circumference or perimeter of a feature. The parts of a segmented feature are called "segments."

A "constraint on segments" is a constraint that a segmented feature in a proportioned parts graph must satisfy. A constraint on segments can be structured in any appropriate way and can include any appropriate criteria. For example, a constraint on segments can include two or more alternative sets of criteria or it may include two or more layers of criteria, such as a first layer including candidate criteria to obtain parts of an image and a second layer including segmented feature criteria to determine whether the parts obtained by the candidate criteria form a segmented feature.

A "specific category of proportioned parts graph" is a category within which proportioned parts graphs are similar. For example, each of the proportioned parts graphs within a specific category may satisfy a constraint on segments such that each graph includes segmented features that meet a feature candidate criterion.

B. General Features

Figure 1:
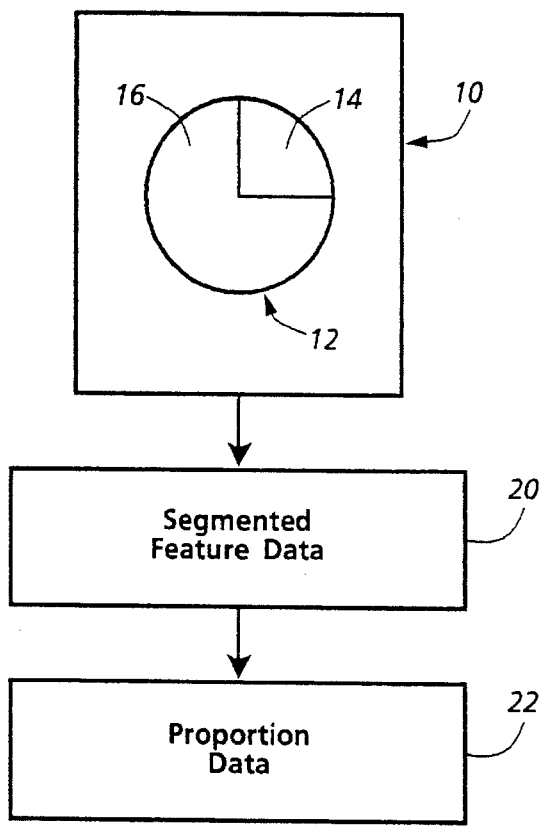
FIG. 1 is a schematic diagram illustrating how an image showing a proportioned parts graph can be analyzed.
Figure 2:
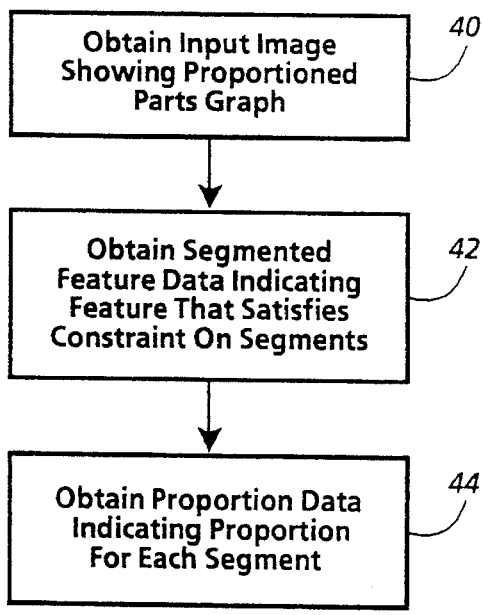
FIG. 2 is a flow chart showing general acts in analyzing an image showing a proportioned parts graph.
Figure 3:
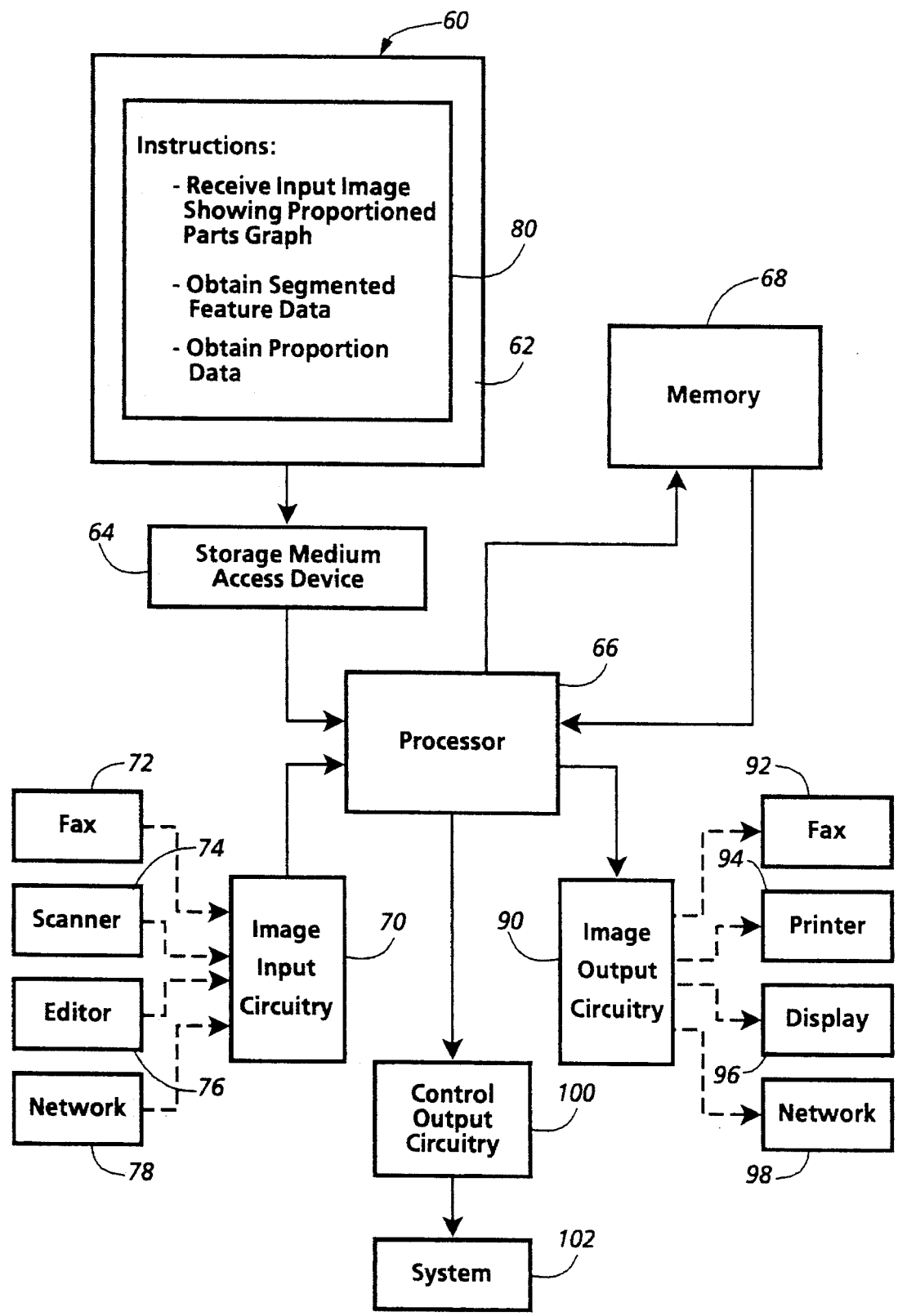
FIG. 3 is a schematic block diagram showing general components of a software product and a machine in which the software product can be used to implement the general acts in FIG. 2.

FIGS. 1–3 show general features of the invention. FIG. 1 shows schematically how an image showing a proportioned parts graph can be analyzed. FIG. 2 shows general acts in analyzing an image showing a proportioned parts graph. FIG. 3 shows general components of a software product and of a machine in which it can be used.

In FIG. 1, image 10 shows a proportioned parts graph. Image 10 can, for example, be a human-produced sketch. The proportioned parts graph includes feature 12, illustratively including segments 14 and 16. A machine receiving data defining image 10 can respond by automatically obtaining segmented feature data 20 indicating a feature that satisfies a constraint on segments; in the illustrated example, segmented feature data 20 could indicate that feature 12, which includes segments 14 and 16, satisfies the constraint. Then the machine can automatically use segmented feature data 20 to obtain proportion data 22 indicating a proportion for each segment of the feature indicated by segmented feature data 20; in the illustrated example, proportion data 22 could indicate that segment 14 has a proportion of about one-fourth and feature 16 has a proportion of about three-fourths.

The general acts in FIG. 2 begin in box 40 by obtaining input image data defining an input image that shows a proportioned parts graph. In response, the act in box 42 uses the input image data to obtain segmented feature data indicating a feature that satisfies a constraint on segments. The act in box 44 then uses the segmented feature data to obtain proportion data indicating a proportion for each segment.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating image processing instructions 80, which processor 66 can execute to perform acts like those in FIG. 2. In executing instructions 80, processor 66 receives input image data defining an input image from image input circuitry 70. The input image shows a proportioned parts graph. Processor 66 uses the input image data to obtain segmented feature data indicating a feature that satisfies a constraint on segments. Processor 66 then uses the segmented feature data to obtain proportion data indicating a proportion for each segment.

Processor 66 can also be connected for providing data defining images to image output circuitry 90. For example, software product 60 could include data indicating instructions processor 66 can execute to use the proportion data to obtain output image data defining an output image. The output image could show a more precisely formed version of the proportioned parts graph, for example. The output image data could be provided to image output circuitry 90, and could in turn be provided to fax machine 92, to printer 94, to display 96, or to network 98.

The proportion data could also be used to provide control signals. For example, memory 68 could store control instructions processor 66 can execute to use the proportion data to obtain control data defining control signals. The control data could be provided to control output circuitry 100, which could respond by providing control signals to system 102.

Rather than being used immediately, the proportion data could instead be stored in memory 68 for possible future use. This would be appropriate, for example, where information indicating an operation to be performed on an input image has not been obtained at the time data defining the input image is received.

C. Implementation

The general features described above could be implemented in numerous ways on various machines to analyze proportioned parts graphs. The implementations described below analyze proportioned parts graphs and use the results to control a graphic rendering system.

1. Image Showing Proportioned Parts Graph

Figure 4:
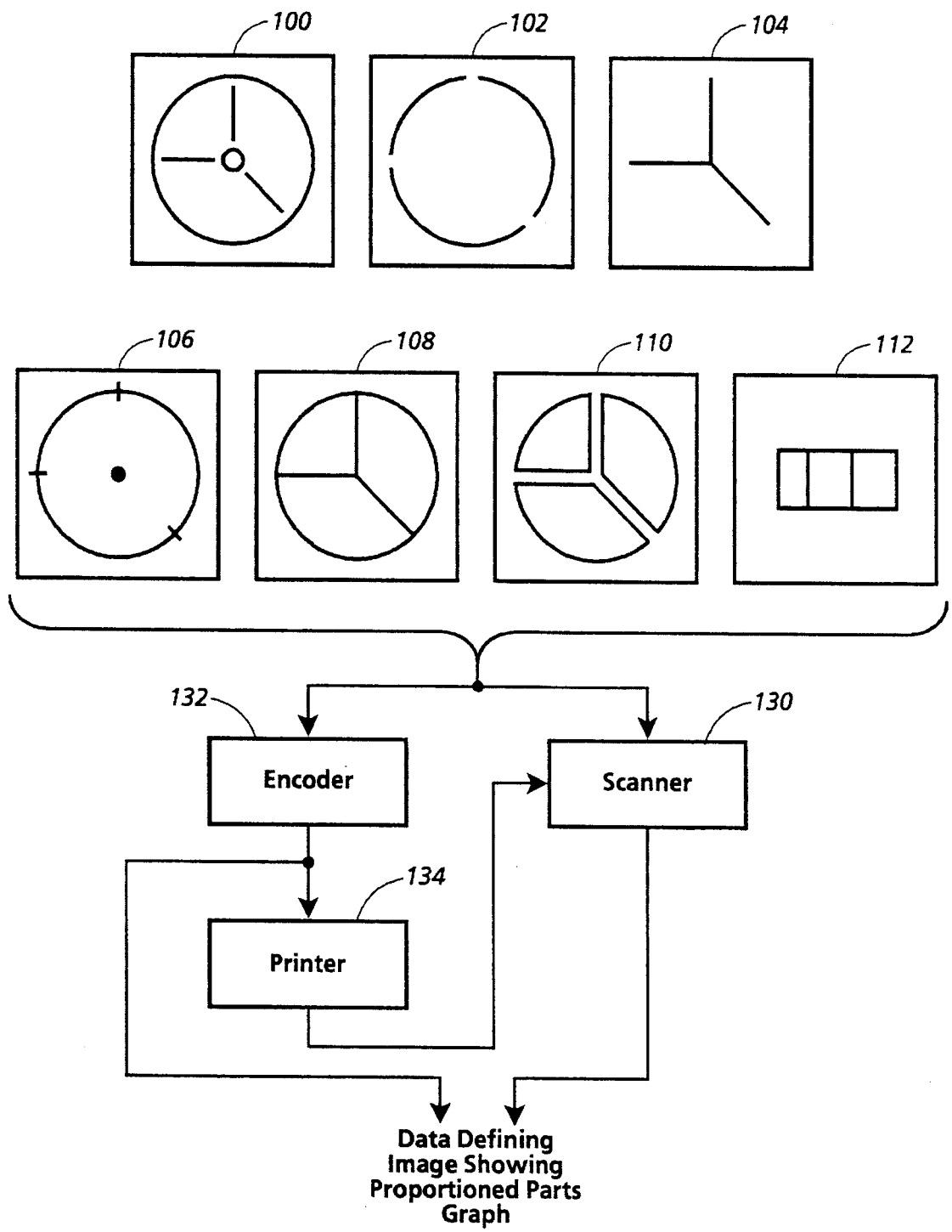
FIG. 4 is a schematic block diagram showing sketches of proportioned parts graphs and ways in which a user can provide data defining an image showing a proportioned parts graph made by hand.
Figure 5:
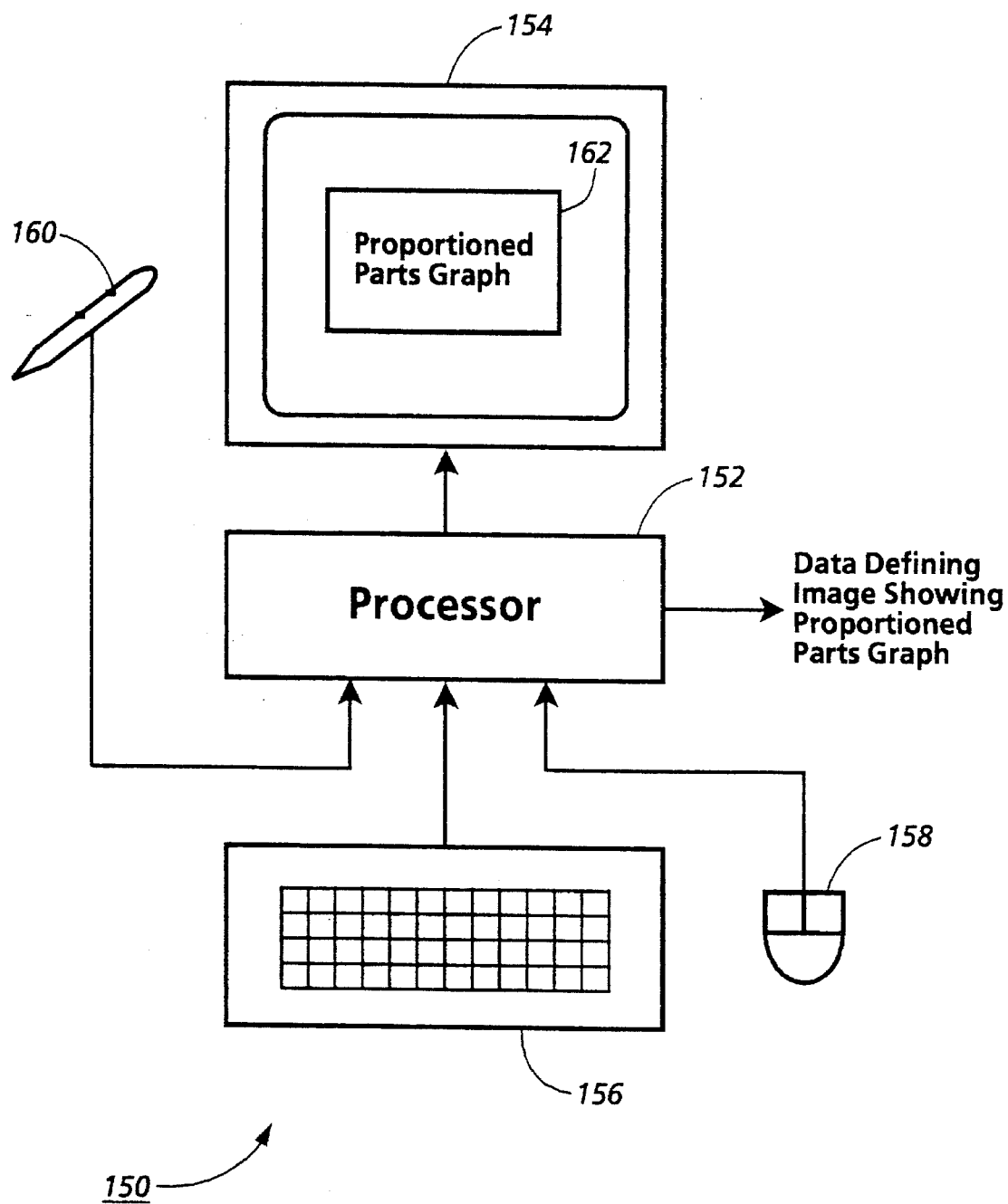
FIG. 5 is a schematic block diagram showing how a user can provide data defining an image showing a proportioned parts graph produced interactively with a machine.

Data defining an image set showing a proportioned parts graph can be obtained in many ways. FIG. 4 illustrates ways in which a user can provide an image showing a hand sketch of a proportioned parts graph. FIG. 5 illustrates ways in which a user can provide an image showing a proportioned parts graph by interacting with a machine.

FIG. 4 shows at the top several examples of images showing proportioned parts graphs. Image 100 shows a pie chart that includes an outer circle, a small circle at the center, and three spokes that extend from near the center to near the outer circle; image 102 a modified pie chart that includes only three arcs of a circle; image 104 a graph that includes three spokes that meet at a center point and extend outward; image 106 a modified pie chart that includes an outer circle, a small connected component at the center, and three hash marks on the outer circle; image 108 a pie chart that includes an outer circle and three spokes that meet at a center point and extend outward to the outer circle; image 110 a pie chart that includes three wedge-shaped connected components; and image 112 a horizontally extending whole bar graph with short vertical lines dividing it into three parts.

In general, the images in FIG. 4 can be obtained in any appropriate way. For example, the proportioned parts graphs can be sketches produced by marking actions performed on a marking medium by hand.

If the marking medium is a sheet, scanner 130 can receive the sheet. Scanner 130 operates on the sheet to provide data defining an image showing a proportioned parts graph.

If the marking medium is a marking surface of an electronic device that can sense marks, encoder 132 can receive signals from the electronic device and use the signals to obtain data defining an image showing a proportioned parts graph. This data can then be provided to printer 134 to obtain a sheet on which marks are printed, and this sheet can be provided to scanner 130. Scanner 130 provides data defining an image showing a proportioned parts graph.

FIG. 4 also shows that data from encoder 132 could be used directly as data defining an image showing a proportioned parts graph. This would be appropriate if encoder 132 could provide data defining an image in response to marking actions.

FIG. 5 shows machine 150, which could be a personal computer, a workstation, or another data processing system. Machine 150 includes processor 152; display 154; keyboard 156; pointing device 158, illustratively a mouse; and screen position indicating device 160, illustratively a stylus. A user can operate keyboard 156 and pointing device 158 to provide signals to processor 152. Or a user can perform marking actions with screen position indicating device 160 on the surface of display 154 to provide signals to processor 152. In response, processor 152 presents and modifies image 162 on display 154, so that the user can continue to provide signals until image 162 shows a desired proportioned parts graph. Then the user can provide a signal requesting that processor 152 provide data defining image 162.

Processor 152 could execute a number of types of software to permit a user to produce an image in the manner described above. Processor 152 could execute document editing software or image editing software, for example.

Data defining an image showing a proportioned parts graph could be produced in any of the ways shown in FIGS. 4 and 5 or in any other appropriate way.

2. System

FIG. 6 shows a system in which the general features described above have been implemented.

System 180 in FIG. 6 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image showing a proportioned parts graph from scanner 184 as described above in relation to FIG. 4. Similarly, CPU 190 can receive data defining an image obtained in the manner described above in relation to FIG. 5 from network 188. In addition, workstation CPU 190 is connected to access program memory 192 and data memory 194 and other conventional workstation peripherals (not shown). Data memory 194 is illustratively storing image data 196 defining an image showing a proportioned parts graph.

Program memory 192 stores instructions CPU 190 can execute to perform operations implementing the general acts in FIG. 2. CPU 190 executes operating system instructions 200 that provide a Unix operating system or other appropriate operating system. Each of the other sets of instructions stored by program memory 192 can be obtained from source code in a conventional programming language such as Lisp, C, or the like with conventional compiler or interpreter techniques. When executed, these other instructions make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image and stores it in data memory 194, as illustrated by image data 196. The data defining the image may be received from scanner 184 or network 188.

In executing image processing instructions 204, CPU 190 calls segmented feature instructions 206 and proportion instructions 208. Image processing instructions 204 also perform other operations relating to analysis of proportioned parts graphs.

In executing segmented feature instructions 206, CPU 190 calls analysis instructions 210 to perform basic geometric analysis of the image defined by image data 196, producing segmented feature data 220. Segmented feature data 220 indicate a feature that satisfies a constraint on segments.

In executing proportion instructions 208, CPU 190 can call analysis instructions 210 to perform basic geometric analysis of an image defined by segmented feature data 220, producing proportion data 222. Proportion data 222 indicate a proportion for each segment of the feature indicated by segmented feature data 220.

In general, many of the acts described below are performed on items of data, each of which defines an image. Each item is referred to as a "data image." Some data images can be used in obtaining others. In general, all of the data images define images with the same number of pixels, and each operation produces an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced. Many examples of such operations are described in copending, coassigned U.S. patent application No. 08/157,600, entitled "Analyzing an Image Showing a Node-Link Structure" ("the Node-Link Structure Application"), and in copending, coassigned U.S. patent application No. 08/157,804, entitled "Analyzing an Image Showing Editing Marks to Obtain Category of Editing Operation" ("the Editing Application"), both of which are incorporated herein by reference.

3. Proportioned Parts Graph Analysis-First Implementation

Figure 7:
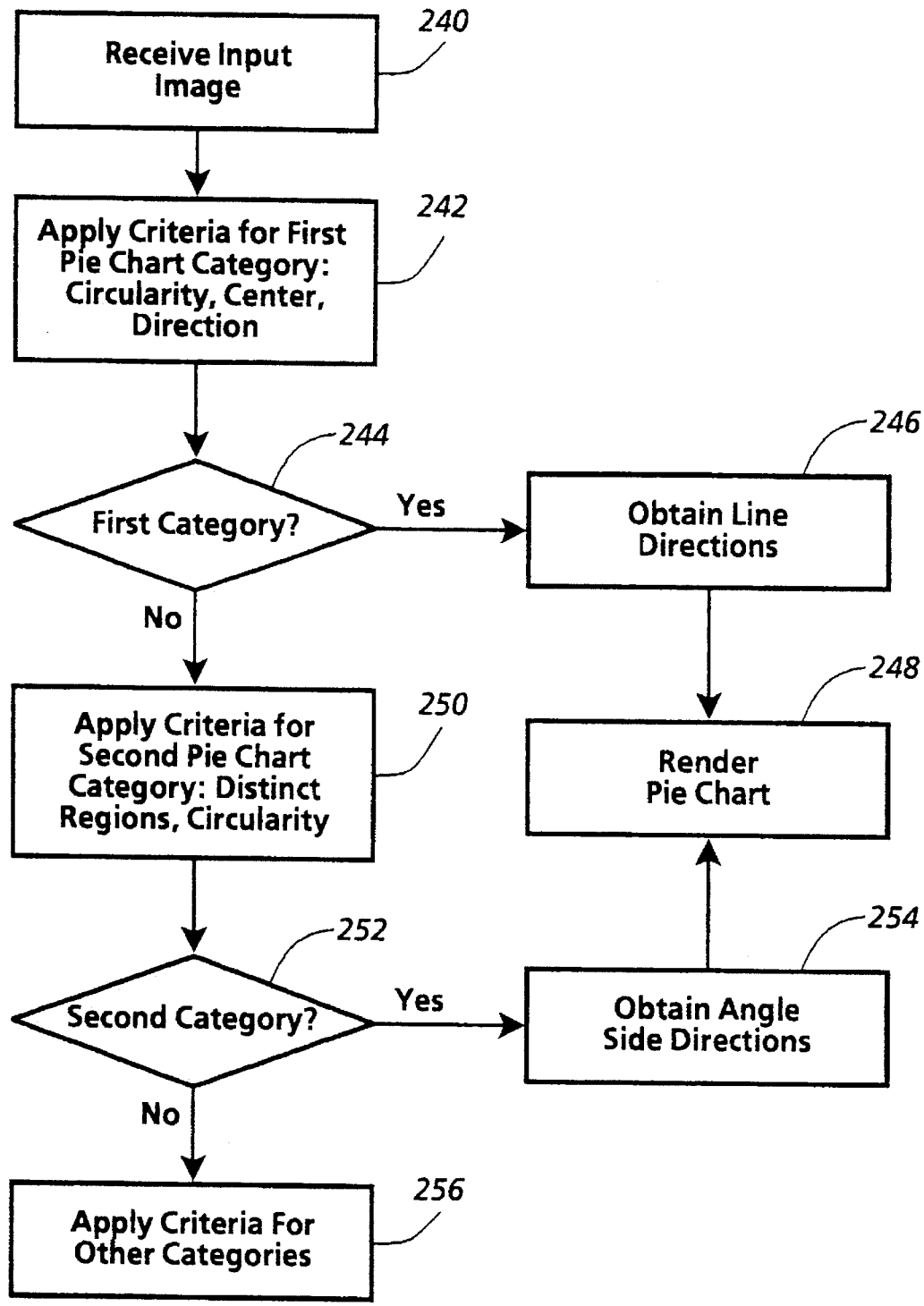
FIG. 7 is a flow chart of acts performed by the machine of FIG. 6 in a first implementation.

FIG. 7 shows acts in executing image processing instructions 204 in FIG. 6 in a first implementation.

The act in box 240 in FIG. 7 begins by receiving data defining an input image. The input image data may have been received previously by executing image receiving instructions 202, and may be provided with a call to image processing instructions 204.

The act in box 242 uses the input image data from box 240 to determine whether the input image shows a feature that satisfies a constraint on segments that includes a circularity criterion, a center criterion, and a direction criterion. These criteria are appropriate for a first category of pie charts, including pie charts with an outer circle, an inner circle at the center, and radial lines extending from near the outer circle to near the inner circle, an example of which is shown as image 100 in FIG. 4. The circularity criterion can require a feature that has an interior cavity with an edge that is within a relatively narrow annulus. The center criterion can require a feature that has a connected component that encloses the center of the interior cavity. The directions criterion can require at least one connected component in the interior cavity that has a mode of direction with respect to the center connected component.

The act in box 242 can apply the circularity criterion by using the input image from box 240 to obtain a largest component data image in which each pixel in the connected component whose bounding box has the largest area is ON. The act in box 242 can then use the largest component data image to obtain a four-way cavities data image and a largest cavity data image, and can then produce an intersecting data image in which each pixel is ON that is ON in both the four-way cavities data image and the largest cavity data image. If the intersecting data image is equal to the largest cavity data image at all pixels, the largest cavity is a four-way cavity.

The act in box 242 can obtain the four-way cavities data image as described in relation to FIG. 7 of the Node-Link Structure Application. The act in box 242 can obtain the largest cavity data image by obtaining a cavities data image as described in relation to FIG. 7 of the Node-Link Structure Application, then obtaining the largest connected component in the cavities data image.

If the largest cavity is a four-way cavity, the act in box 242 can perform a one-dimensional grouping operation as described in copending, coassigned U.S. patent application No. 08/158,053, entitled "Analyzing an Image or Other Data to Obtain a Stable Number of Groups" ("the Grouping Application"), incorporated herein by reference. The grouping operation can be performed over the areas of the connected components in the four-way cavities data image to obtain a biggest components data image. The act in box 242 can use the biggest components data image to obtain an edges data image as described in relation to FIG. 7 of the Node-Link Structure Application. The act in box 242 can also use the biggest components data image to obtain a center point data image in which a pixel is ON at the center of the bounding box around the ON pixels in the biggest components data image.

The act in box 242 can use the center point data image to obtain a distances data image as described in relation to FIG. 7 of the Node-Link Structure Application. The distances data image can be used to obtain the maximum and minimum distances of the pixels that are ON in the edges data image. If the difference between the maximum and minimum distances is less than half of the minimum distance, the second test determines that the input image meets a circularity criterion.

The act in box 242 can next apply the center criterion. The act in box 242 can first use the largest component data image to obtain a four-way cavities data image as described in relation to FIG. 7 of the Node-Link Structure Application.

The act in box 242 can then AND the four-way cavities data image with the largest component data image to obtain a contents data image showing connected components inside the largest component, and can then use the contents data image to obtain a hollows data image. The act in box 242 can then use the hollows data image to determine whether the input image meets the center criterion. If the hollows data image contains no connected components, the input image does not meet the center criterion. If the hollows data image includes only one connected components, the center criterion is met.

If the hollows image includes more than one connected component, the act in box 242 can obtain a circle center data image and use the circle center data image and the hollows data image to perform a coloring operation as described in relation to FIG. 7 of the Node-Link Structure Application, the coloring operation produces a single hollow data image showing the connected component from the hollows data image that includes the circle center, if any. The act in box 242 can then OR the single hollow data image to determine whether it includes any connected components. If so, the input image meets the center criterion, but if not, the input image does not.

The act in box 242 can obtain the hollows data image by first using the contents data image to obtain an exterior data image, a holes data image, and an enclosures data image as described in relation to FIG. 7 of the Node-Link Structure Application. The act in box 242 can then perform a coloring operation with the exterior data image and the holes data image to obtain a data image showing the connected components in the exterior data image that include holes. The act in box 242 can then perform a set difference operation as described in relation to FIG. 7 of the Node-Link Structure Application to remove any connected components in the enclosures data image. The act in box 242 can then obtain the intersection of the resulting data image with the contents data image to obtain the hollows data image.

The act in box 242 can obtain the circle center data image by first using the largest component data image to obtain a distances data image as described in relation to FIG. 7 of the Node-Link Structure Application. The act in box 242 can use the distances data image with the four-way cavities data image described above to obtain the circle center data image in which each pixel is ON that is in the interior of the largest component that is at the greatest distance from the largest component.

The act in box 242 can next apply the direction criterion. The act in box 242 can obtain a centerless contents data image and a radial directions data image, then use the data images to obtain a direction for each connected component in the centerless contents data image. If the list of directions includes at least one direction, the input image meets the direction criterion. To avoid analysis of an input image with only one direction, which is not ordinarily meaningful, the direction criterion could instead require two directions.

The act in box 242 can use the contents data image and the hollows data image or the single hollow data image to obtain the centerless contents data image. The act in box 242 can perform a set difference operation to remove the center shown either in the hollows data image or the single hollow data image from the contents data image.

To obtain the radial direction data image, the act in box 242 can first use the hollows data image or the single hollow data image to obtain a filled data image as described in relation to FIG. 7 of the Node-Link Structure Application. The act in box 242 can then obtain a directions data image in which each pixel is labeled with a direction to a near neighbor connected component in the filled data image, as described in relation to FIG. 7 of the Node-Link Structure Application.

The act in box 242 can then perform a component-serial operation. For each connected component, the act in box 242 can obtain the first and second modes of orientation by obtaining a region orientation data image as described in relation to FIG. 13 of the Editing Application and then obtaining a frequency for each orientation that occurs. If the most frequent, or first, mode is sufficiently more frequent than the second mode, which can be determined by comparing a ratio of their frequencies with a threshold ratio, then each pixel in the connected component can be labeled with the first mode of orientation using a spread operation, obtaining the radial direction data image.

The act in box 244 then branches based on whether the input image meets all the criteria for the first category of pie charts. If so, the act in box 246 obtains a list of line directions, which are the directions described above in relation to the direction criterion. The act in box 248 then renders a pie chart by loading the line directions from the list into a page description language (PDL) file, such as a PostScript file, which can then be provided to a printer.

If the input image does not meet the first category's criteria, the act in box 250 uses the input image data from box 240 to determine whether the input image shows a feature that satisfies a constraint on segments that includes a distinct regions criterion and a circularity criterion. These criteria are appropriate for a second category of pie charts, including pie charts with an outer circle and radial lines connected to the outer circle and extending to a connecting point near the center of the outer circle, an example of which is shown as image 108 in FIG. 4. The distinct regions criterion can require at least two distinct regions within the feature. The circularity criterion can require a largest connected component that, after removing parts between distinct regions, is within a relatively narrow annulus.

The act in box 250 can apply the distinct regions criterion by first using input image 340 to obtain a largest component data image as described above, then use the largest component data image to obtain a four-way cavities data image as described above. The act in box 250 can OR the four-way cavities data image to determine whether it has at least one connected component. If not, the input image does not meet the distinct regions criterion.

If the four-way cavities data image includes at least one connected component, the act in box 250 can obtain a count of the connected components. If the count is greater than one, the input image meets the distinct regions criterion.

The act in box 250 can then apply the circularity criterion. To do so, the act in box 250 can obtain left-right sandwich and up-down sandwich data images. The act in box 250 can then OR the sandwich data images to obtain a sandwiched parts data image showing parts of the input image that are between four-way cavities. The sandwiched parts data image can then be removed from the largest component data image, and a circularity criterion as described above can then be applied to the largest remaining component.

The act in box 250 can use the four-way cavities data image to obtain a cavity identifiers data image in which each four-way cavity is labeled with a unique identifier, as described in relation to FIG. 7 of the Node-Link Structure Application. The act in box 250 can then use the cavity identifiers data image to obtain the left-right and up-down sandwich data images. Each sandwich data image can be obtained by first comparing first and second neighbor identifier data images, and leaving pixels ON at which the first and second data images are not equal and both have non-zero values.

For the left-right sandwich data image, the first and second neighbor identifier data image are a left neighbor data image and a right neighbor data image. Each of these data images indicates a unique identifier of a near connected component in the respective direction. For the up-down sandwich data image, the first and second neighbor identifier data image are an up neighbor data image and a down neighbor data image. Each of these data images similarly indicates a unique identifier of a near connected component in the respective direction.

After performing a set difference operation to remove the sandwiched parts data image from the largest component data image, the act in box 250 can apply the circularity criterion to the remaining data image. The circularity criterion can be applied as described above in relation to box 242.

The act in box 252 then branches based on whether the input image meets the criteria for the second category of pie charts. If so, the act in box 254 obtains a list of angle side directions. The act in box 248 then renders a pie chart by loading the directions from the list into a page description language (PDL) file, such as a PostScript file, which can then be provided to a printer.

The act in box 254 can obtain a list of angle side orientations using a labeled angles data image in which pixels in each connected component in the four-way cavities data image are labeled with 360 times the ratio of the connected component's area to the sum of the areas of all the connected components in the four-way cavities data image. The act in box 254 can obtain a list of the values that occur in the labeled angles data image, adjust them to add to 360 by subtracting excess from the largest angle or adding deficiency to the smallest angle, and return a list of cumulative angles, so that each angle indicates a direction of a line between two angular segments of the feature.

If the input image does not meet the second category's criteria, the act in box 256 can apply criteria for categories of graphical representations other than pie charts, as described in relation to FIG. 7 of copending, coassigned U.S. patent application No. 08/158,063, entitled "Using a Category to Analyze an Image Showing a Graphical Representation" ("the Categorizing Application"), incorporated herein by reference.

4. Proportioned Parts Graph Analysis-Second Implementation

FIG. 8 shows acts in executing image processing instructions 204 in FIG. 6 in a second implementation. FIG. 9 shows acts in executing segmented feature instructions 206 in FIG. 6 in the second implementation. FIGS. 10–15 illustrate six specific categories of proportioned parts graphs for which the second implemention has been used to obtain a precisely formed pie chart.

The act in box 260 in FIG. 8 begins by receiving data defining an input image. The input image data may have been received previously by executing image receiving instructions 202, and may be provided with a call to image processing instructions 204.

The act in box 262 applies criteria for other categories of graphical representations, such as for specific categories of parallel length graphs as described in relation to FIG. 8 of the Categorizing Application. The act in box 264 branches based on whether the criteria for another category are met. If so, the act in box 266 handles the input image appropriately for the other category.

If the criteria for the other categories are not met, the act in box 268 begins an iterative loop that considers each of a number of specific categories of proportioned parts graphs (PPGs). The act in box 270 begins each iteration by obtaining feature candidate data images for the next specific category. The feature candidate data images show parts of the input image that meet feature candidate criteria for the specific category.

Techniques for obtaining feature candidate data images for several specific PPG categories are discussed below. As discussed there, the act in box 270 can obtain two feature candidate data images for each specific PPG category. One is a center candidate data image showing parts of the input image that meet a criterion for center candidates. The other is either a direction candidate data image or an angle candidate data image. The direction candidate data image shows parts of the input image that meet a criterion for direction unit candidates. The angle candidate data image shows parts of the input image that meet a criterion for angle unit candidates.

The act in box 272 then applies generic PPG criteria to the features in the feature candidate data images. The PPG criteria can include, for example, a center criterion and either a direction criterion or an angle criterion, discussed in greater detail below in relation to FIG. 9. The direction criterion can include a radial criterion, and the PPG criteria can also require directional nearness of any part that meets the direction criterion or the angle criterion.

The act in box 274 branches based on whether the input image satisfies a constraint on PPGs that includes the feature candidate criteria in box 270 and the center criterion and direction criterion or angle criterion in box 272. If so, the act in box 276 obtains proportions for the feature that satisfies the constraint, and the act in box 278 renders a pie chart representing the proportions. But if not, the act in box 268 begins an iteration for the next specific category of PPG. When all PPG categories have been tried, the act in box 280 provides a failure message, as described in relation to FIG. 8 of the Categorizing Application.

FIG. 9 shows how the acts in boxes 272 and 274 in FIG. 8 can be implemented. The act in box 290 in FIG. 9 begins by receiving candidates data which can include a center candidate data image and either a direction candidates data image or an angle candidates data image.

The act in box 292 branches based on whether the center candidate data image meets a center criterion. The act in box 292 can be implemented by ORing the pixels of the center candidate data image to determine whether at least one pixel has a non-zero value, so that there is at least one connected component. If not, the next category's iteration begins in box 268.

If the center candidate data image meets the center criterion, the act in box 294 branches based on the type of the other candidate data image, either a direction candidate data image or an angle candidate data image.

If a direction candidate data image, the act in box 300 applies a first part of a direction criterion by testing whether the direction candidate data image includes at least two connected components. The number of connected components can be obtained by shrinking each connected component to a single black pixel in a shrink data image as described in relation to FIG. 7 of the Node-Link Structure Application, and by then counting the black pixels in the shrink data image.

If the direction candidate data image includes at least two connected components, the act in box 302 applies a radial criterion and a nearness criterion to obtain a direction units data image showing direction units, meaning connected components that are near the center and that extend radially from the center.

The act in box 302 can use the center candidate data image to obtain a distances data image in which each pixel is labeled with a distance from the pixel to the nearest connected component in the center candidate data image. The distances data image can be obtained in a manner similar to the distances data image described in relation to FIG. 7 of the Node-Link Structure Application.

The act in box 302 can also use the center candidate data image to obtain a directions data image in which each pixel is labeled with an angle from zero to 360 degrees indicating direction from the pixel to the nearest connected component in the center candidate data image. The directions data image can also be obtained as described in relation to FIG. 7 of the Node-Link Structure Application, by taking the arctangent of the ratio of the y and x offsets to the nearest neighbor, and by then adjusting the resulting value to be between zero and 360 degrees.

The act in box 302 can gate the distances data image and the directions data image, each with the direction candidate data image to obtain a gated distances data image and a gated directions data image.

The act in box 302 can then perform a spread operation similar to that described in relation to FIG. 7 of the Node-Link Structure Application to label all pixels having each label in the gated directions data image with the smallest value any of those pixels have in the gated distances data image. The resulting data image can then be compared at each pixel with the gated distances data image to obtain a closest points data image in which a pixel is ON if it is the pixel with a given direction label that is closest to the center, thus applying the nearness criterion.

The act in box 302 can also use the direction candidate data image and the gated directions data image to obtain a direction modes data image. As described in relation to FIG. 7 of the Node-Link Structure Application, the pixels of each connected component in the direction candidate data image can be labeled with a unique identifier and each connected component can then be handled separately. The mode of the values from the gated directions data image can be obtained for each connected component, and each pixel in the connected component can be labeled with the mode. The results for all the connected components can be combined and compared with the gated directions data image to obtain the mode points data image showing the pixels with the mode of direction for their components.

The act in box 302 can AND the closest points data image and the mode points data image to obtain a seed data image showing only those pixels that are close to the center and have the mode of direction for their components. The seed data image can then be used in a coloring operation as described in relation to FIG. 7 of the Node-Link Structure Application to obtain the direction units data image showing only those connected components in the direction candidate data image that include a pixel that is ON in the seed data image, thus applying the radial criterion.

The direction units data image from box 302 shows direction units that are connected components extending radially from the center. Each segment is bounded by two of the direction units.

The act in box 304 applies a second part of the direction criterion by determining whether the direction units data image from box 302 includes two or more connected components, which can be implemented as described above in relation to box 300. If not, the next category's iteration begins in box 268. But if so, the act in box 276 uses the direction units data image to obtain proportion data.

The act in box 276 can use the directions data image described above in relation to box 302 and the direction units data image from box 302 to obtain a direction modes data image in which each pixel in a connected component in the direction units data image is labeled with its direction from the center, similar to the direction modes data image described above in relation to box 302. The act in box 276 can then obtain the label of each connected component and sort the labels to form a list. Each segment's proportion is indicated by the difference between the labels of the spokes that bound the segment, so that the list of labels is the proportion data.

If the act in box 294 branched with an angle candidate data image, the act in box 310 applies a first part of the angle criterion by determining whether the angle candidate data image includes two or more connected components. This can be done in the same way as the act in box 300. If not, the next category's iteration begins in box 268.

If the act in box 310 finds two or more connected components, the act in box 312 uses the angle candidate data image and the center candidate data image to apply a nearness criterion, obtaining an angle units data image showing angle units, meaning connected components that are near the center.

The act in box 312 can obtain an angle units data image in a manner similar to box 302, as described above. The act in box 312 can use the center candidate data image to obtain a distances data image in which each pixel is labeled with a distance from the pixel to the nearest connected component in the center candidate data image. The act in box 312 can also use the center candidate data image to obtain a directions data image in which each pixel is labeled with an angle from zero to 360 degrees indicating direction from the pixel to the nearest connected component in the center candidate data image. The act in box 312 can gate the distances data image and the directions data image, each with the angle candidate data image to obtain a gated distances data image and a gated directions data image.

The act in box 312 can then perform a spread operation to label all pixels having each label in the gated directions data image with the smallest value any of those pixels have in the gated distances data image. The resulting data image can then be compared at each pixel with the gated distances data image to obtain a closest points data image in which a pixel is ON if it is the pixel with its direction label that is closest to the center. The act in box 312 can use the closest points data image and the angle candidate data image in a coloring operation to obtain the angle units data image showing only those connected components in the angle candidate data image that include a pixel that is ON in the closest points data image, thus applying the nearness criterion.

The angle units data image from box 312 shows angle units, which are connected components that each have a point that is near the center. Each segment is one of the angle units.

The act in box 314 can apply a second part of the angle criterion by determining whether there are two or more connected components in the angle units data image. The act in box 314 can be implemented like box 300. If there are not two or more angle units, the next category's iteration begins in box 268. But if there are two or more angle units, the act in box 276 uses the angle units data image to obtain proportion data.

The act in box 276 can use the angle units data image from box 312 to obtain an area data image in which each pixel in a connected component in the angle units data image is labeled with the area of the connected component, as described in relation to FIG. 7 of the Node-Link Structure Application. The act in box 276 can then convert the areas to angles by multiplying each pixel's value in the area data image by 360, then dividing by the total number of ON pixels in the angle units data image and rounding the result to obtain an angles data image.

The act in box 276 can then obtain a list of the values from the angles data image, add the values, and subtract 360 to determine whether the sum is equal to 360 degrees. If the sum is less than 360 degrees, the angles values can be sorted from smallest to largest and the difference can be added to the smallest. If the sum is greater than 360 degrees, the angles values can be sorted from largest to smallest and the difference can be subtracted from the largest.

The act in box 276 can then use the adjusted angle values to obtain a list of cumulative angles, by creating a list that initially has only an angle of zero, with additional terms being included by adding another angle from the list of adjusted angle values to the angle most recently added to the list. The last angle added to the list is 360, and it can then be removed to obtain the list of cumulative angles. Each segment's proportion is indicated by the segment's angle, which is the difference between two angles on the list of cumulative angles, so that the list of cumulative angles is the proportion data.

The proportions from box 276 in FIG. 8 can be used for various purposes. For example, they can be used to obtain a precisely formed proportioned parts graph. FIGS. 10–15 illustrate six specific PPG categories, showing in each case how proportions obtained from a sketch have been used to obtain a precisely formed pie chart in which each segment is uniquely shaded. In each case, the proportions can be loaded into a page description language (PDL) file, such as a PostScript file, which can then be provided to a printer. The segments can be numbered from 1 through the total number of segments, and each segment can be described by a starting angle, an ending angle, and a floating point number that is the ratio of the segment's number to the total number of segments.

Figure 10:
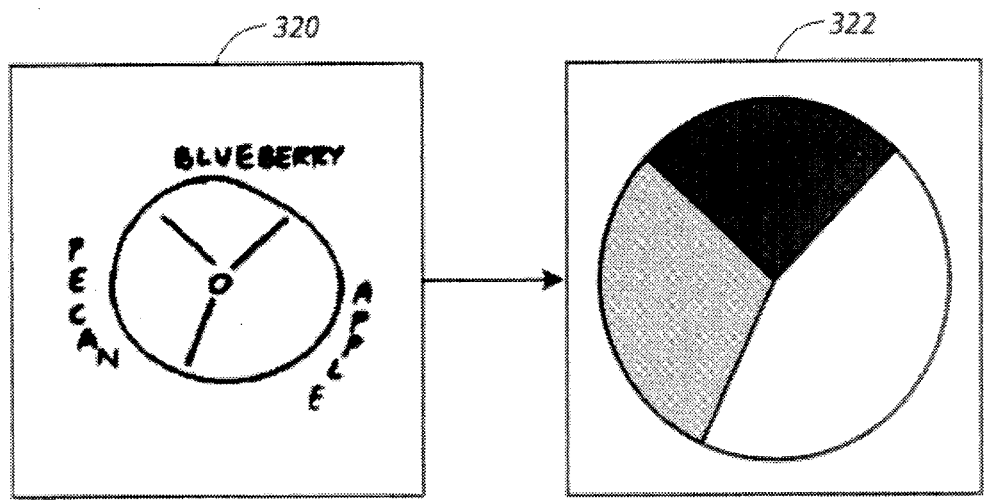
Figure 11:
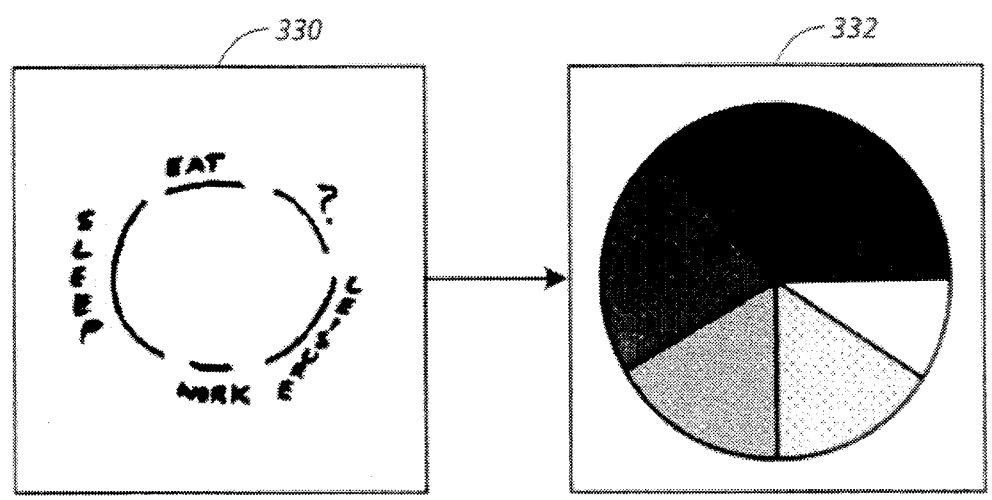
Figure 12:
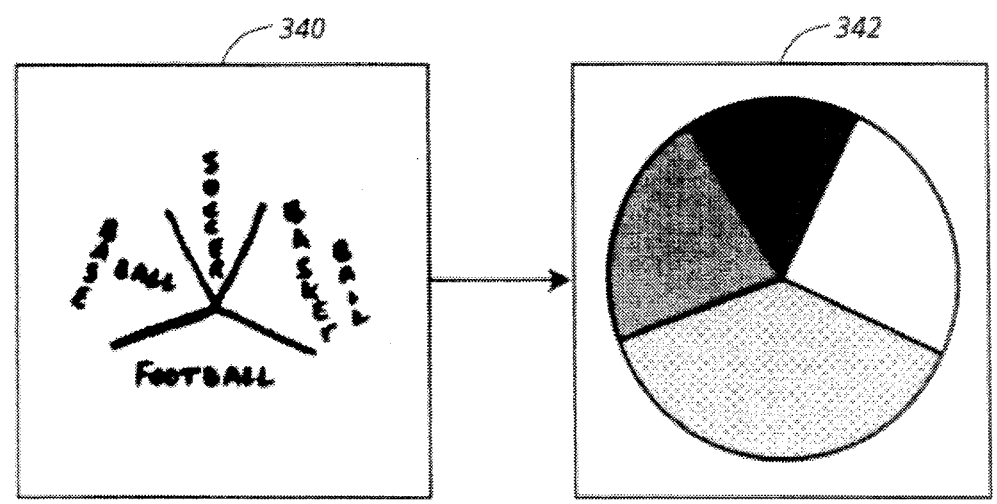
Figure 13:
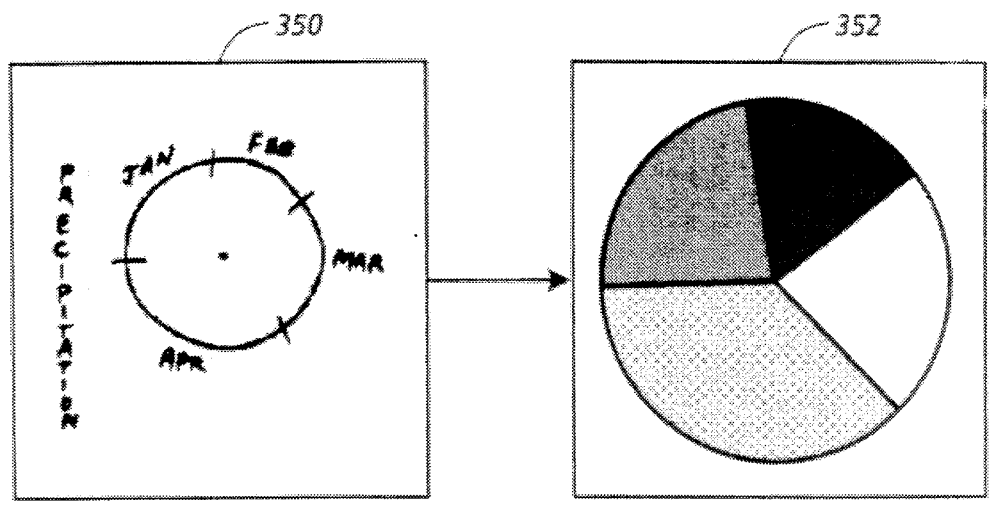
Figure 14:
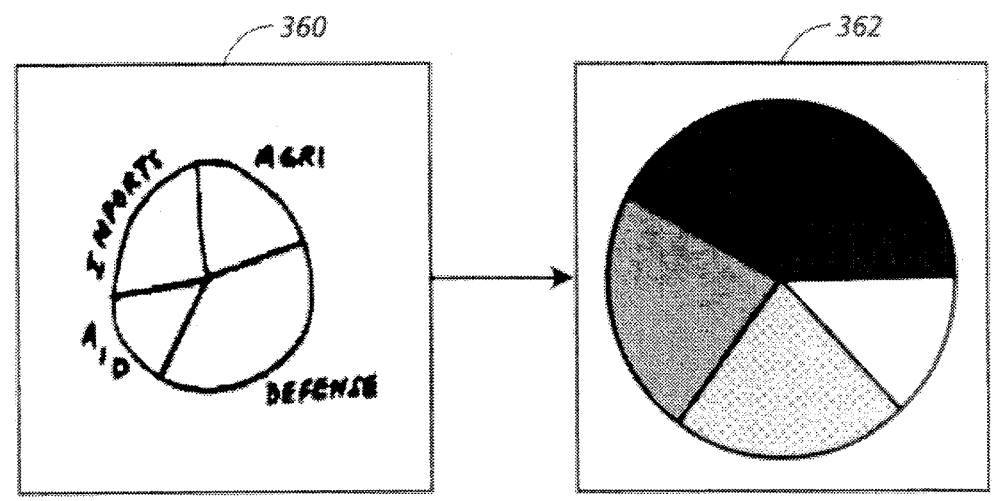
Figure 15:
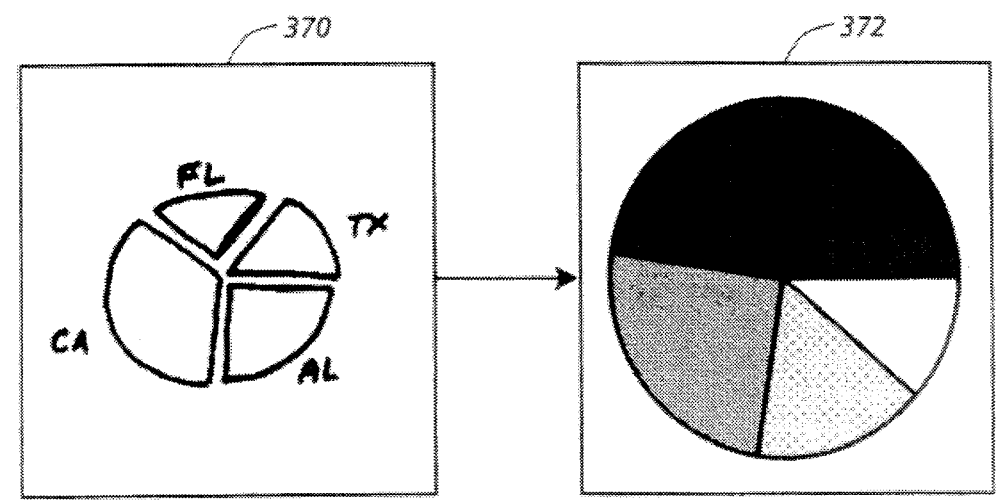

FIG. 10 illustrates a sketch of a pie chart with a large outer circle, a small inner circle, and three lines extending from near the inner circle to near the outer circle. FIG. 11 illustrates a sketch of a pie chart with five arcs of a circle. FIG. 12 illustrates a sketch of a pie chart with four lines extending radially from a center point. FIG. 13 illustrates a sketch of a pie chart in which a large outer circle is divided into arcs by hash marks and a dot marks a center point. FIG. 14 illustrates a sketch of a pie chart with a large outer circle and four lines extending from the outer circle to a center point at which they meet. FIG. 15 illustrates a sketch of a pie chart in which each segment is a wedge-shaped boundary.

a. First Category

In FIG. 10, input image 320 shows a sketch that is an instance of a first specific PPG category. The sketch includes a circle, a small circular connected component marking the center of the circle, and three lines extending from near the center to near the circle defining three segments of the circle. Outside the circle are labels for the segments.

The act in box 270 can obtain the center candidate data image for the first specific PPG category by applying a center candidate criterion in substantially the same way as the act in box 242 in FIG. 7, described above, applies a center criterion. In the second implementation, however, the center candidates data image is a filled data image obtained from the hollows data image.

The act in box 270 can obtain a direction candidate data image for the first specific PPG category by applying a direction candidate criterion that includes a contents part and an elongation part. The act in box 270 can apply the contents part of the criterion in substantially the same way as the act in box 242 in FIG. 7, described above, obtains a centerless contents data image. If the centerless contents data image includes at least one ON pixel, so that it includes a connected component, the contents part of the criterion is met.

The act in box 270 can then apply the elongation part of the criterion to the centerless contents data image to obtain the direction candidate data image. The act in box 270 can apply the elongation part by first obtaining an elongation data image in which each pixel in a connected component is labeled with a value between zero and 100 indicating elongation of the connected component. Then the elongation data image can be compared at each pixel with an elongation threshold, which can illustratively have a value of 70. Pixels with elongation values greater than the threshold are ON in the direction candidate data image.

An elongation data image can be obtained by labeling each pixel with the values necessary to compute a measure of how elongated an object is in the conventional manner, using, for example, the technique described in Winston, P. H. and Horn, B. K. P., *Lisp*, Addison-Wesley, Reading, Mass., 1981, pp. 121–136 and 339–343. Then, the elongation can be computed for each pixel. Each pixel's value in the elongation data image can then be scaled to a value between 0 and 100.

The center candidate data image and the direction candidate data image are the feature candidates data images for the first category.

When proportions are then obtained from a direction units data image as described above in relation to box 276 in FIG. 8, the proportions can be used to produce output image 322. As shown, output image 322 is a precisely formed pie chart with segments that have relative proportions similar to the segments defined by the lines from near the center to near the circle in input image 320.

b. Second Category

In FIG. 11, input image 330 shows a sketch that is an instance of a second specific PPG category. The sketch includes five arcs that together form segments of a circle. Outside the arcs are labels for the segments.

The act in box 270 can obtain the center candidate data image for the second specific PPG category by first using input image from box 260 to obtain a partial ground data image as described in the Grouping Application. The act in box 270 can perform a coloring operation using the partial ground data image and a border data image in which each pixel of the image border is ON to obtain a border ground data image; as used here, "image border" means the set of pixels in an image that do not have a four-adjacent pixel in at least one direction. Each pixel is ON in the border ground data image if it is in a connected component in the partial ground data image and if the connected component includes a pixel that is ON in the border data image. The act in box 270 can then perform a set difference operation as described in relation to FIG. 7 of the Node-Link Structure Application to remove the pixels in the border ground data image from the partial ground data image, leaving a center candidate data image in which the pixels within the circle are ON.

The act in box 270 can obtain an angle candidate data image for the second specific PPG category by obtaining a nearest components data image that shows the connected components in the input image that are nearest to the connected component in the center candidate data image.

The act in box 270 can obtain the nearest components data image by first ORing the center candidate data image and the input image. The result is used as the union data image. The act in box 270 can use the union data image to obtain a neighbor labeled data image in which each pixel is labeled with a unique identifier for a near connected component in the union data image. The act in box 70 can then perform a coloring operation to obtain a first filtered data image in which a pixel in a connected component in the neighbor labeled data image is ON if the connected component includes an ON pixel in the center candidate data image. The act in box 270 can then obtain an adjacent data image, and use the adjacent data image in another coloring operation to obtain a second filtered data image in which a pixel in a connected component in the neighbor labeled data image is ON if the connected component includes an ON pixel in the adjacent data image. The act in box 270 can then AND the second filtered data image with the input image to obtain the nearest components data image.

The act in box 270 can obtain the adjacent data image using the first filtered data image. The act in box 270 can obtain the complement of the first filtered data image, and use the complement to obtain an edges data image as described in relation to FIG. 7 of the Node-Link Structure Application. The edges data image is the adjacent data image.

The center candidate data image and the angle candidate data image are the feature candidates data images for the second category.

When proportions are then obtained from an angle units data image as described above in relation to box 276 in FIG. 8, the proportions can be used to produce output image 332. As shown, output image 332 is a precisely formed pie chart with segments that have relative proportions similar to the segments defined by the arcs in input image 330.

c. Third Category

In FIG. 12, input image 340 shows a sketch that is an instance of a third specific PPG category. The sketch includes four lines that meet at a center point and that together form segments of a 360 degree angle. Between the lines are labels for the segments.

The act in box 270 can obtain a center candidate data image for the third specific PPG category by using input image 340 to obtain a largest component data image as described above. The act in box 270 can then use the largest component data image to obtain a branching factor data image as described in relation to FIG. 7 of the Node-Link Structure Application. In the center candidate data image, a pixel is ON if its value in the branching factor data image is three or more.

The act in box 270 can obtain an angle candidate data image for the third specific PPG category by first performing a set difference operation to remove the connected component in the center candidate data image from the largest component data image to obtain a possible lines data image. The act in box 270 can then apply a first part of the angle candidate criterion to the possible lines data image to obtain a lines data image. The act in box 270 can then apply a second part of the angle candidate criterion to the lines data image to obtain an elongated lines data image that is the angle candidate data image. The second part of the angle candidate criterion can be an elongation criterion as described above in relation to FIG. 10, with an elongation threshold of 90.

The act in box 270 can apply the first part of the angle candidate criterion by using the possible lines data image to obtain a terminations data image as described in relation to FIG. 7 of the Node-Link Structure Application. A shrink data image can be obtained from the terminations data image as described in relation to FIG. 7 of the Node-Link Structure Application. A spread operation as described in relation to FIG. 7 of the Node-Link Structure Application can then be performed to obtain a termination number data image in which each pixel in each connected component in the possible lines data image is labeled with the sum of the number of pixels in the shrink data image that are in the connected component, which is equal to the number of terminations.

The act in box 270 can use the possible lines data image to obtain a branching factor data image as described above. The act in box 270 can use the branching factor data image to obtain a junctions data image in which a pixel is ON if its value in the branching factor data image is three or more. The act in box 270 can then perform a coloring operation using the junctions data image to obtain a colored junctions data image in which each pixel is ON that is in a connected component in the possible lines data image that includes a pixel that is ON in the junctions data image. The act in box 270 can then perform a set difference operation to remove connected components in the colored junctions data image from the possible lines data image to obtain a no junctions data image.

The act in box 270 can, for each pixel, compare the terminations data image with two to obtain a two terminations data image showing only the connected components that have two terminations. The act in box 270 can AND the two terminations data image with the no junctions data image to obtain the lines data image.

The center candidate data image and the elongated lines data image are the feature candidates data images for the third category.

When proportions are then obtained from an angle units data image as described above in relation to box 276 in FIG. 8, the proportions can be used to produce output image 342. As shown, output image 342 is a precisely formed pie chart with wedges that have relative proportions similar to the segments defined by the lines in input image 340.

d. Fourth Category

In FIG. 13, input image 350 shows a sketch that is an instance of a fourth specific PPG category. The sketch includes a circle, a small connected component marking the center of the circle, and four short radial lines intersecting the circle and defining four segments of the circle. Outside the circle are labels for the segments and a title for the sketch.

The act in box 270 can obtain a center candidate data image for the fourth specific PPG category by first using input image 350 to obtain a largest component data image as described above. The act in box 270 can apply a circularity criterion as described above in relation to box 242 in FIG. 7 to the largest component data image, returning the largest component data image if the criterion is met and returning a NIL data image if not.

The act in box 270 can then use the largest component data image to obtain a four-way cavities data image as described above, and can then AND the four-way cavities data image with input image 350 to obtain a circle contents data image. The act in box 270 can also use the largest component data image to obtain a circle center data image as described above in relation to box 242 in FIG. 7. The act in box 270 can then perform a coloring operation to obtain a center object data image in which a pixel in a connected component in the circle contents data image is ON if the connected component includes an ON pixel in the circle center data image. The center object data image is the center candidate data image.

The act in box 270 can obtain a direction candidate data image for the fourth specific PPG category by first using the largest component data image to obtain a branching factor data image as described above and then using the branching factor data image to obtain a junctions data image in which a pixel is ON if its value in the branching factor data image is three or more. The junctions data image is the direction candidate data image.

The center candidate data image and the direction candidate data image can be the feature candidates data images for the fourth category.

For the fourth category, it would also be possible to obtain an angle candidate data image instead of a direction candidate data image. The act in box 270 could perform a set difference operation to remove the branches data image from the largest component data image to obtain the angle candidate data image.

When proportions are then obtained from a direction units data image, or alternatively from an angle units data image, as described above in relation to box 276 in FIG. 8, the proportions can be used to produce output image 352. As shown, output image 352 is a precisely formed pie chart with segments that have relative proportions similar to the segments defined by the short radial lines intersecting the circle in input image 350.

e. Fifth Category

In FIG. 14, input image 360 shows a sketch that is an instance of a fifth specific PPG category. The sketch includes a circle and four lines inside the circle, each extending from an intersection point near the center of the circle to the circle to form segments of a circle. Outside the circle are labels for the segments.

The below-described technique for the fifth category begins by finding wedge-like parts, then uses the wedge-like parts to find the lines or spokes between them. The wedge-like parts and spokes can then be used to find a center.

To obtain a center candidate data image for the fifth specific PPG category, the act in box 270 can use input image 360 to obtain a largest component data image as described above, then use the largest component data image to obtain a four-way cavities data image as described above. The act in box 270 can then use the four-way cavities data image to obtain a sandwiched parts data image using a technique similar to the one described above in relation to box 250 in FIG. 7. The left-right sandwich data image can, however, be obtained in a manner that requires that a pixel's near neighbor be either its left neighbor or its right neighbor; similarly, the up-down sandwich data image can be obtained in a manner that requires that a pixel's near neighbor be either its up neighbor or its down neighbor.

The act in box 270 can then use the sandwiched parts data image to obtain a first edges data image and the complement of the four-way cavities data image to obtain a second edges data image, as described in relation to FIG. 7 of the Node-Link Structure Application. The act in box 270 can then AND the first and second edges data images to obtain an adjacent edges data image. The act in box 270 can perform two spread operations as described in relation to FIG. 7 of the Node-Link Structure Application to obtain an edge area data image and an intersection area data image.

The act in box 270 can perform two spread operations as described in relation to FIG. 7 of the Node-Link Structure Application to obtain an edge area data image and an intersection area data image. In the edge area data image, each pixel in a connected component in the sandwiched parts data image is labeled with the sum of pixels in the connected component that are ON in the first edges data image. In the intersection area data image, each pixel in a connected component in the sandwiched parts data image is labeled with the sum of pixels in the connected component that are ON in the adjacent edges data image.

The act in box 270 can then obtain a filtered sandwiched parts data image by comparing, at each pixel, twice the value from the intersection area data image with the value from the edge area data image. If the intersection area is more than half the edge area, the pixel is ON in the filtered sandwiched parts data image.

The act in box 270 can use the filtered sandwiched parts data image to obtain a junctions data image as described above. The junctions data image can be the center candidate data image.

For the fifth specific PPG category, the act in box 270 can also obtain the four-way cavities data image as the angle candidate data image.

The junctions data image and the four-way cavities data image described above are the feature candidates data images for the fifth category.

When proportions are then obtained from an angle units data image as described above in relation to box 276 in FIG. 8 the proportions can be used to produce output image 362. As shown, output image 362 is a precisely formed pie chart with segments that have relative proportions similar to the segments defined by the lines in input image 360.

f. Sixth Category

In FIG. 15, input image 370 shows a sketch that is an instance of a sixth specific PPG category. The sketch includes four wedges that have outer sides that together form an approximation to a circle. Each wedge has a corner opposite its outer side, and the corners opposite the outer sides are all near a center of the circle. Outside the circle are labels for the segments.

The below-described technique for the sixth category begins by finding wedge-like parts, then uses the wedge-like parts to find the areas or spokes between them. The wedge-like parts and spokes can be ORed and filled and the edge around the filled result can be tested for circularity. If it is approximately circular, it can then be used to find a center at the point of maximum distance from the edge.

To obtain the center candidate data image for the sixth specific PPG category, the act in box 270 can use input image 370 to obtain a four-way cavities data image as described above. The act in box 270 can use the four-way cavities data image to obtain a filtered sandwiched parts data image as described above in relation to the fifth category. The filtered sandwiched parts data image can be ORed with input image 370, and a coloring operation can be performed to obtain a connected parts data image in which each pixel is ON that is in a connected component in the ORed data image that includes an ON pixel in the filtered sandwiched parts data image.

The act in box 270 can use the connected parts data image to obtain a filled data image as described in relation to FIG. 7 of the Node-Link Structure Application. The filled data image can be used to obtain a roundness data image, and the roundness data image can be compared at each pixel with a roundness threshold to obtain a filtered roundness data image in which each pixel is ON if its value in the roundness data image is greater than the roundness threshold. The roundness threshold may, for example, have a value of 60.

A roundness data image can be obtained by labeling each pixel with the values necessary to compute a measure of how round an object is in the conventional manner, using, for example, the technique for measuring compactness described in Winston, P. H. and Horn, B. K. P., *Lisp*, Addison-Wesley, Reading, Mass., 1981, pp. 121–136 and 339–343. Then, roundness can be computed for each pixel.

Each pixel's value in the roundness data image can then be scaled to a value between 0 and 100.

The act in box 270 can obtain a round cavities data image by ANDing the four-way cavities data image and the filtered roundness data image.

The act in box 270 can perform a set difference operation to obtain a radial parts data image in which the round cavities data image is removed from the filtered roundness data image. Then the act in box 270 can use the filtered roundness data image to obtain an edges data image as described in relation to FIG. 7 of the Node-Link Structure Application, and the edges data image can be used to obtain a distances data image as also described in relation to FIG. 7 of the Node-Link Structure Application.

The act in box 270 can then perform a spread operation to obtain a maximum distance data image in which each pixel in each connected component in the radial parts data image is labeled with the maximum value from the distances data image for the pixels in the connected component. The maximum distances data image can be compared with the distances data image to obtain the distant points data image in which each pixel is ON if its values are equal.

The act in box 252 can AND the distant points data image with the radial parts data image to obtain the center candidate data image.

For the sixth specific PPG category, the round cavities data image can be the angle candidate data image.

The center candidate data image and the round cavities data image described above can be the feature candidates data images for the sixth category.

When proportions are then obtained from an angle units data image as described above in relation to box 276 in FIG. 8, the proportions can be used to produce output image 372. As shown, output image 372 is a precisely formed pie chart with segments that have relative proportions similar to the segments defined in input image 370.

5. Variations

The implementations described above use particular operations to obtain segmented feature data, proportion data, and other data from an image showing a proportioned parts graph. Numerous other combinations of operations besides those described above could be used to obtain segmented feature data and proportion data.

The implementations described above apply various criteria to graphical representations in obtaining segmented feature data and proportion data. Other criteria could be used. For example, it may be useful to apply an angular extent criterion to some pie charts to determine whether the total of the angles is 360°.

The implementation described above in relation to FIG. 8 tries each specific PPG category until it finds feature candidates that satisfy the PPG criteria. If the technique succeeds for an early category, however, other categories that might produce better results will not be tried. Therefore, the implementation could be modified to return to box 268 after obtaining proportions in box 276, with subsequent occurrences of the act in box 276 overwriting previously obtained proportions, or performing some other operation to determine which list of proportions should be retained. Finally, when all the specific PPG categories have been handled, the act in box 278 can perform rendering. But if none of the specific PPG categories led to success, a failure message could be provided in box 280.

The implementation in FIG. 8 can be inefficient, because it requires extensive testing or verification to determine whether a proportioned parts graph fits one of the specific PPG categories. The implementation might be made more efficient by adding an initial, quick test to determine which of the specific PPG categories are likely to succeed. Then, the acts in boxes 270, 272, and 274, including the more rigorous verification in box 272, could be performed only for categories likely to succeed. For example, the initial test might be based on whether quickly computed characteristics meet appropriate criteria.

Unfortunately, however, initial experiments indicate that it may be difficult to find quick tests for some specific PPG categories. It may also be difficult to find easy operations to obtain feature candidates for some specific PPG categories. Therefore, it may prove advantageous to develop a general technique for obtaining data indicating parts of any proportioned parts graph that satisfy a saliency constraint, then performing a rigorous verification operation for proportioned parts graphs as in FIGS. 7 and 8, but only on the parts that satisfy the saliency constraint. The saliency constraint should be intuitive so that a user can understand it and apply it in creating new specific PPG categories. This might enable automatic analysis of a new specific PPG category, provided the relevant parts of the new category satisfy the saliency constraint and provided the new category fits within the generic category of proportioned parts graphs.

The implementation in FIG. 8 could also be modified to include more interaction with a user, allowing the user to indicate specific PPG categories to be tried or to indicate whether results are satisfactory.

The implementations described above obtain segmented feature data, proportion data, and other data for several types of proportioned parts graphs that include segments of a circle or segments of a 360 degree angle. Data could be obtained for proportioned parts graphs of other kinds, such as the one shown in box 112 in FIG. 4. In addition, data could be obtained for proportioned parts graphs that also represent additional information in other ways, such as a radial pie chart in which the radial extent of each segment represents further information about the part whose proportion it represents.

The implementations described above provide proportion data to produce an output image showing a pie chart. The proportion data could be used to produce an output image showing any other type of proportioned parts graph, or to produce an output image showing some other type of graphical or textual representation of the proportions indicated by the proportion data.

The implementation described above in relation to FIG. 8 could be extended in a straightforward manner to provide a user interface allowing a user to add a specific PPG category. To facilitate this extension, operations that use one or more starting data images to obtain another data image can be called with a suggestive name and with the starting data images as arguments. Illustrative functions include "largest-component"; "4-way-cavities"; "circle-contents"; "circle-center"; "hollows"; "id" to label each connected component with a unique identifier; "filter-elongated"; "partial-ground"; "nearest-components"; "junctions"; and "filter-lines", each of which can be implemented as described above.

With sufficient practice, a user can develop an intuitive visual sense of the input/output relationship of each of these functions. Therefore, a user can learn to write a line or two of code defining a new operation to obtain feature candidates as in box 270 in FIG. 8 for a new PPG category. The new operation can receive data defining an input image and use it to obtain feature candidates data images showing center candidates and direction or angle candidates.

New operations as described above can typically be defined with a few lines of code, making it easy for a user to add new specific PPG categories. The act in box 270 in FIG. 8 can then be performed by calling the new operation defined by the user.

When such code is compiled or interpreted, repetitive computation of equivalent data images can be automatically detected so that, during execution, results are cached to permit sharing. This technique can improve efficiency to a surprising extent, and is applicable to image processing operations in general.

The implementations described above use models that are implemented by procedures that determine whether a proportioned parts graph is in each specific PPG category. It may be advantageous, however, to use a database of models that can be accessed to obtain a specific PPG category. A user interface could be provided to allow a user to create additional models that could be added to the database, making the database user extensible. For example, the user might provide an image showing a proportioned parts graph that is an instance of a new specific PPG category; the user might also provide a collection of additional images, each labeling a distinct component of the model of the new category and annotated with the salient parameters of the component. With a database, the sophistication of analysis could increase over time, allowing more varied and complex categories.

The implementations described above ignore labels, title, and other parts of an image that do not form a proportioned parts graph, but could be extended to extract labels, titles, and other image parts so that they could be handled in an appropriate way. Labels and titles could be cut and pasted into an output image. Or labels and titles could be recognized using optical character recognition (OCR), and data indicating characters in the labels and titles could be returned. Constraints could be imposed to facilitate extraction of labels, titles, and so forth; for example, a constraint could require that all labels be outside a circle, and that a segment label be closer to its segment than to any other segment.

The implementations described above can operate on human-produced images showing graphical representations that satisfy certain constraints. A machine could be implemented to produce images satisfying the same constraints automatically, in which case the implementations could be applied to machine-produced imaged.

The implementations described above handle certain operations in a component-serial fashion, obtaining terminations or distances for each connected component separately and then combining the results. Most other operations are handled in component-parallel fashion. The mix of component-serial and component-parallel operations could be varied in any appropriate way; all operations could be component-parallel, all could be component-serial, or some could be component-parallel and others component-serial.

The implementations described above use currently available image processing techniques, but could readily be modified to use newly discovered image processing techniques as they become available. For example, component-parallel techniques for obtaining terminations and distances between connected components might be used instead of component-serial techniques; the component-parallel techniques might use Voronoi boundaries or Voronoi regions, for example, spreading minimum distances from locations on a Voronoi boundary.

The implementations described above operates on binary images, but could be extended to operate on color or gray scale images, either directly or after binarization.

The implementations described above use the results of image analysis to control rendering, but image analysis results could be used for a variety of other purposes. For example, the results of image analysis could be stored to preserve a graphical representation generated during a meeting using a tool such as a computer-controlled whiteboard device, for which user interface techniques are described in copending, coassigned U.S. patent application Nos. 07/869,554, continued as application No. 08/394,919, entitled "Generalized Wiping as a User Interface for Object-Based Graphical Displays," and 07/869,559, now issued as U.S. Pat. No. 5,404,439, "Time-Space Object Containment for Graphical User Interface," both incorporated herein by reference.

The rendering back ends of the implementations described above are based on a collection of PostScript code fragment templates, made interactively using the IDRAW program in the X window system. Examples of such code fragments include code to draw axes of an X-Y graph and code to draw a bar in a bar chart. Parameters of a graphical representation are automatically inserted into a PostScript code fragment template, and data defining an output image with a more precise version of the graphical representation is obtained by invoking a sequence of PostScript code fragments according to the structure of a category that applies to the graphical representation. This approach is compatible with many PostScript-based drawing/rendering programs. To make an interface to a new drawing system, one would simply perform interactive operations to obtain a collection of PostScript code fragment template files.

One of the advantages of the implementations described above is that the user can draw a relatively simple sketch to indicate a relatively complicated graphical representation that can be rendered automatically in response to the sketch. Therefore, the sketch cannot specify all the relevant parameters of the output image, making it necessary for parameters that are not specified to default sensibly. In the implementations described above, default parameters are supplied by rendering procedures. A user could instead provide defaults, such as in an initialization file. Defaults could be provided for specific categories and for specific rendering systems.

The implementations described above perform acts in a specific order that could instead be performed in another order. In FIG. 8, for example, the order in which the PPG categories are attempted could be changed, or other criteria could be applied after trying the PPG categories. In FIG. 7, the two pie chart categories could be tried in the opposite order.

The implementation described above in relation to FIG. 6 employs a workstation CPU that executes image processing instructions. FIG. 16 shows an alternative implementation that uses an image processing server. This implementation can provide the usual advantages of server architectures, including economy, speed, and sharing of resources.

System 390 in FIG. 16 includes network 392, workstation 394, storage server 396, and image processing server 398. A user can operate workstation 394 to provide requests on network 392 for storage of data defining images, such as from a scanner or other source. In response, storage server 396 can store the data. Then, the user can operate workstation 394 to provide requests for image processing operations like those described above. In response, image processing server 398 can perform the requested operations, executing instructions like those described above in relation to FIG. 6.

D. Application

The invention could be applied in many ways. FIG. 17 shows how the techniques described above could be applied in a personal computer that can operate as a fax server. FIG. 18 illustrates how the techniques described above could be applied in a copier.

System 400 in FIG. 17 includes CPU 402, which can be the CPU of a personal computer such as an IBM PC compatible machine. CPU 402 is connected to receive user input signals from keyboard 404 and mouse 406, and can present images to a user through display 408. CPU 402 is also connected to a number of other peripheral devices, illustratively including disk drive 410, modem 412, scanner 414, and printer 416.

Program memory 420 stores operating system (OS) instructions 422, which can be a version of DOS; user interface instructions 424; fax server instructions 426; and image processing instructions 428. Fax server instructions 426 can be similar to the PaperWorks™ software product described in copending, coassigned U.S. patent application No. 08/096,198, entitled "Data Access Based on Human-Produced Images," now continued as No. 08/543,232, incorporated herein by reference. Image processing instructions 428 can be implemented as described above in relation to image processing instructions 204 in FIG. 6 and in relation to FIGS. 7–15. Fax server instructions 426 and image processing instructions 428 could be obtained in the form of a software product stored on a floppy disk, diskette, or CD-ROM, and accessed for storage in program memory 420 by disk drive 410.

Data memory 440 stores input image data 442, segmented feature data 444, and proportion data 446 as described above in relation to FIGS. 6–9 and, in more detail, in relation to FIGS. 10–15. Data memory 440 can also store output image data 448 if image processing instructions 428 obtain data defining an output image as described above in relation to FIGS. 10–15.

System 400 can obtain input image data 442 defining an image that shows a proportioned parts graph in many ways: Data defining an image showing a proportioned parts graph could be produced interactively as described above in relation to FIG. 5, such as by executing user interface instructions 424. Any appropriate user interface techniques could be used, including pen-based techniques. Data defining a previously produced image showing a proportioned parts graph could be retrieved from a storage medium by disk drive 410. Data defining an image showing a proportioned parts graph could be obtained from scanner 414 as described above in relation to FIG. 4. A user could produce data defining an image showing a proportioned parts graph elsewhere and provide it to system 400 through modem 412, such as by making a facsimile transmission to modem 412.

CPU 402 could execute fax server instructions 426 in response to a request received by facsimile transmission through modem 412. The request could include a form indicating an analysis operation and also indicating an output image destination such as a fax machine or printer 416. The request could also include data defining an image showing a proportioned parts graph or could indicate an image previously obtained by system 400.

Fax server instructions 426 could include calls to image processing instructions 428 to perform acts like those shown in FIGS. 7–9 if the request indicates an image processing operation. Execution of fax server instructions 426 could further provide data defining a rendered image produced in box 248 in FIG. 7 or in box 278 in FIG. 8. The data defining the rendered image could be provided to modem 412 for facsimile transmission or to printer 416 for printing.

The implementations described above are especially well suited to offline sketch analysis as in FIG. 17 because speed of analysis matters less for offline analysis than it would for online analysis. Also, reliability may matter more for offline analysis than it would for online analysis. As illustrated in FIG. 18, however, the implementations described above may also be applied in online analysis, such as in a copier.

In FIG. 18, copier 460 can be a digital copier or other electronic reprographics system. Scanning circuitry 462 obtains data defining input image 464 showing a proportioned parts graph. User interface circuitry 470 includes touch sensing device 472, which can be a push button, a heat or pressure sensitive element, a capacitance sensing element, or other device for sensing a touching action. When a user touches device 472, user interface circuitry 470 provides touch data indicating that device 472 has been touched.

Processing circuitry 480 uses the touch data to obtain request data indicating a request for an analysis operation. Then, responding to the request, processing circuitry 480 uses data defining input image 464 to automatically obtain segmented feature data indicating a feature of input image 464 that satisfies a constraint on segments and uses the segmented feature data to obtain proportion data indicating each segment's proportion. Processing circuitry 480 then uses the proportion data to obtain data defining an output image that shows a proportioned parts graph with segments having the indicated proportions. This data is provided to printing circuitry 490 for printing of output image 492.

The invention could also be applied in combination with other techniques, including those described in copending, coassigned U.S. Patent Application Nos. 08/158,132, now issued as U.S. Pat. No. 5,445,898 entitled "Analyzing an Image Showing a Graphical Representation of a Layout"; No. 08/158,062, now continued as No. 08/503,746, entitled "Analyzing an Image Showing a Parallel Length Graph"; and 08/108,063, entitled "Using a Category to Analyze an Image Showing a Graphical Representation," all incorporated herein by reference.

E. Miscellaneous

The invention has been described in relation to implementations that analyze images showing human-produced images showing sketches. The invention might also be implemented to analyze other types of images, by using appropriate criteria to obtain data indicating a segmented feature and to obtain data indicating proportions of segments in a proportioned parts graph.

The invention has been described in relation to applications in which proportion data are used to obtain data defining an output image. The invention might also be implemented to store proportion data or to use proportion data for other purposes, such as to provide control signals.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method comprising:
obtaining input image data defining an input image that shows a proportioned parts graph; the proportioned parts graph being a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria, the set of criteria including one or more criteria;
applying the set of criteria to the input image data to obtain segmented feature data; the segmented feature data indicating a feature that satisfies the constraint on segments; and
using the segmented feature data to obtain proportion data indicating, for each segment of the feature that satisfies the constraint on segments, a proportion; each segment's proportion indicated by the proportion data being approximately equal to the proportion the segment's size bears to the entirety of the feature that satisfies the constraint on segments.

2. The method of claim 1 in which the constraint on segments includes a circularity criterion; the circularity criterion requiring a part of the input image that is approximately circular; the act of applying the set of criteria to the input image data to obtain segmented feature data comprising:
obtaining circular part data indicating a part of the input image that meets the circularity criterion; and
using the circular part data to obtain the segmented feature data.

3. The method of claim 1 in which the constraint on segments includes a center criterion requiring a part of the input image that is approximately at a center of the feature that satisfies the constraint on segments; the act of applying the set of criteria to the input image data to obtain segmented feature data further comprising:
obtaining center part data indicating a part of the input image that meets the center criterion; and
using the center part data to obtain the segmented feature data.

4. The method of claim 1 in which the constraint on segments includes a direction criterion requiring a part of the input image that indicates a direction with respect to a reference point; the act of applying the set of criteria to the input image data to obtain segmented feature data further comprising:
obtaining direction part data indicating a part of the input image that meets the direction criterion; and
using the direction part data to obtain the segmented feature data.

5. The method of claim 4 in which the direction criterion further requires a part of the input image that is approximately radial with respect to the reference point.

6. The method of claim 4 in which the constraint on segments further requires that the part of the input image that meets the direction criterion be nearer to the reference point in the indicated direction than any other part that meets the direction criterion; the act of using the direction part data to obtain the segmented feature data comprising:
using the direction part data to determine whether the indicated part is nearer to the reference point in the indicated direction than any other part that meets the direction criterion; and
if so, using the direction part data to obtain the segmented feature data.

7. The method of claim 1 in which the constraint on segments includes an angle criterion requiring a part of the input image that indicates an angle; the act of applying the set of criteria to the input image data to obtain segmented feature data comprising:
obtaining angle part data indicating a part of the input image that meets the angle criterion; and
using the angle part data to obtain the segmented feature data.

8. The method of claim 7 in which the angle criterion further requires a part of the input image that indicates an angle with respect to a reference point; the constraint on segments further requiring that the part of the input image that meets the angle criterion be nearer to the reference point within the indicated angle than any other part that meets the angle criterion; the act of using the angle part data to obtain the segmented feature data comprising:

using the direction part data to determine whether the indicated part is nearer to the reference point within the indicated angle than any other part that meets the angle criterion; and if so, using the angle part data to obtain the segmented feature data.

9. The method of claim 1 in which the constraint on segments includes a distinct regions criterion requiring at least two parts of the input image that indicate distinct regions within the feature that satisfies the constraint on segments; the act of applying the set of criteria to the input image data to obtain segmented feature data comprising:

obtaining region parts data indicating parts of the input image that meet the distinct regions criterion; and if the region parts data indicate at least two parts, using the region parts data to obtain the segmented feature data.

10. The method of claim 1 in which the constraint on segments includes, for each of a number of specific categories of proportioned parts graphs, a feature candidate criterion and, for all of the specific categories, a segmented feature criterion; the act of applying the set of criteria to the input image data to obtain segmented feature data comprising:

obtaining feature candidate data indicating parts of the input image that meet the feature candidate criterion for one of the specific categories of proportioned parts graphs; and using the feature candidate data to obtain the segmented feature data; the segmented feature data indicating parts indicated by the feature candidate data that also meet the segmented feature criterion.

11. The method of claim I in which the proportioned parts graph is a pie chart.

12. The method of claim 1 in which the proportion data include a list of directions.

13. The method of claim 1 in which the proportion data include a list of angles.

14. The method of claim 1 in which the input image is a human-produced image showing a sketch of a proportioned parts graph.

15. The method of claim 14 further comprising:
using the proportion data to obtain output image data defining an output image that includes a proportioned parts graph similar to the sketch.

16. A method of operating a machine that includes:
image input circuitry for obtaining data defining images as input; and
a processor connected for receiving data defining images from the image input circuitry;
the method comprising:
operating the processor to receive input image data from the image input circuitry, the input image data defining an input image that shows a proportioned parts graph; the proportioned parts graph being a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria., the set of criteria including one or more criteria;

operating the processor to apply the set of criteria to the input image data to obtain segmented feature data; the segmented feature data indicating a feature that satisfies the constraint on segments; and operating the processor to use the segmented feature data to obtain proportion data indicating, for each segment of the feature that satisfies the constraint on segments, a proportion; each segment's proportion indicated by the proportion data being approximately equal to the proportion the segment's size bears to the entirety of the feature that satisfies the constraint on segments.

17. The method of claim 16 in which the machine further comprises image output circuitry for providing data defining images as output; the input image being a human-produced image showing a sketch of a proportioned parts graph; the method further comprising:

using the proportion data to obtain output image data defining an output image that includes a proportioned parts graph similar to the sketch; and providing the output image data to the image output circuitry.

18. A machine comprising:
image input circuitry for obtaining data defining images as input;
memory for storing data; and
a processor connected for receiving data defining images from the image input circuitry and connected for accessing data stored in the memory;
the data stored in the memory comprising instruction data indicating image processing instructions the processor can execute; the processor, in executing the image processing instructions:

receiving input image data from the image input circuitry, the input image data defining an input image that shows a proportioned parts graph; the proportioned parts graph being a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria, the set of criteria including one or more criteria;

applying the set of criteria to the input image data to obtain segmented feature data; the segmented feature data indicating a feature that satisfies the constraint on segments; and using the segmented feature data to obtain proportion data indicating, for each segment of the feature that satisfies the constraint on segments, a proportion; each segment's proportion indicated by the proportion data being approximately equal to the proportion the segment's size bears to the entirety of the feature that satisfies the constraint on segments.

19. The machine of claim 18 in which the input image circuitry is connected for receiving facsimile transmissions.

20. The machine of claim 18 in which the machine further comprises image output circuitry for providing data defining images as output; the processor further, in executing the image processing instructions:

using the proportion data to obtain output image data defining an output image that includes a proportioned parts graph representing the indicated proportions; and providing the output image data to the image output circuitry.

21. The machine of claim 20 in which the output image circuitry is connected for providing facsimile transmissions.

22. The machine of claim 18 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the image processing instructions.

23. The machine of claim 18 in which the machine is a fax server.

24. The machine of claim 18 in which the machine is a copier.

25. An article of manufacture for use in a machine that includes:

image input circuitry for obtaining data defining images as input;

a storage medium access device for accessing a medium that stores data; and a processor connected for receiving data defining images from the image input circuitry; the processor further being connected for receiving data from the storage medium access device;

the article comprising:

a storage medium that can be accessed by the storage medium access device when the article is used in the system; and data stored by the storage medium so that the storage medium access device can provide the stored data to the processor when the article is used in the system; the stored data comprising instruction data indicating instructions the processor can execute; the processor, in executing the instructions:

receiving input image data from the image input circuitry, the input image data defining an input image that shows a proportioned parts graph; the proportioned parts graph being a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria, the set of criteria including one or more criteria;

applying the set of criteria to the input image data to obtain segmented feature data; the segmented feature data indicating a feature that satisfies the constraint on segments; and using the segmented feature data to obtain proportion data indicating, for each segment of the feature that satisfies the constraint on segments, a proportion; each segment's proportion indicated by the proportion data being approximately equal to the proportion the segment's size bears to the entirety of the feature that satisfies the constraint on segments.

26. A method comprising:

obtaining input image data defining an input image that shows a proportioned parts graph; the input image data being an array of items of data, each item of data having a value indicating a color of a respective location of the input image; the proportioned parts graph being a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria, the set of criteria including one or more criteria;

applying the set of criteria to the input image data to obtain segmented feature data; the segmented feature data indicating a feature in the input image that satisfies the constraint on segments; and using the segmented feature data to obtain proportion data indicating, for each segment of the feature that satisfies the constraint on segments, a proportion; each segment's proportion indicated by the proportion data being approximately equal to the proportion the segment's size bears to the entirety of the feature that satisfies the constraint on segments.

27. A method comprising:

obtaining input image data defining an input image that shows a proportioned parts graph; the proportioned parts graph being a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria, the set of criteria including one or more criteria;

applying the set of criteria to the input image data to obtain segmented feature data; the segmented feature data indicating a feature in the input image that satisfies the constraint on segments; the segmented feature data being an array of items of data, each item of data having a value indicating whether a location of the input image is in the feature that satisfies the constraint on segments; and using the segmented feature data to obtain proportion data indicating, for each segment of the feature that satisfies the constraint on segments, a proportion; each segment's proportion indicated by the proportion data being approximately equal to the proportion the segment's size bears to the entirety of the feature that satisfies the constraint on segments.

28. A method comprising:

obtaining input image data defining an input image that shows a proportioned parts graph; the proportioned parts graph being a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria, the set of criteria including one or more criteria;

applying the set of criteria to the input image data by performing image processing on the input image data to obtain segmented feature data; the segmented feature data defining a segmented feature image that shows a feature from the input image that satisfies the constraint on segments; and performing image processing on the segmented feature data to obtain proportion data indicating, for each segment of the feature that satisfies the constraint on segments, a proportion; each segment's proportion indicated by the proportion data being approximately equal to the proportion the segment's size bears to the entirety of the feature that satisfies the constraint on segments.

29. A method comprising:

obtaining input image data defining an input image that shows a graphical representation with a feature that defines two or more segments, each segment representing a part that bears a proportion to a whole, each segment having a size that bears approximately the same proportion to the entirety of the feature as the part the segment represents bears to the whole; the feature satisfying a constraint on segments; the constraint including a set of criteria, the set of criteria including one or more criteria;

applying the set of criteria to the input image data to obtain segmented feature data; the segmented feature data defining a segmented, feature image that shows the feature that satisfies the constraint on segments; and performing image processing on the segmented feature data to obtain proportion data indicating, for each segment of the feature that satisfies the constraint on segments a proportion; each segment's proportion indicated by the proportion data being approximately equal to the proportion the segment's size bears to the entirety of the feature that satisfies the constraint on segments.

30. The method of claim 29 in which each segment's size is an angle.

31. The method of claim 29 in which each segment's size is an area.

* * * * *